(12) United States Patent
Maruyama

(10) Patent No.: US 9,660,519 B2
(45) Date of Patent: May 23, 2017

(54) SWITCHING POWER SUPPLY CIRCUIT AND POWER FACTOR CORRECTION CIRCUIT

(71) Applicant: FUJI ELECTRIC CO., LTD., Kawasaki (JP)

(72) Inventor: Hiroshi Maruyama, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 1 day.

(21) Appl. No.: 14/988,247

(22) Filed: Jan. 5, 2016

(65) Prior Publication Data

US 2016/0241134 A1     Aug. 18, 2016

(30) Foreign Application Priority Data

Feb. 17, 2015    (JP) ................................. 2015-028520

(51) Int. Cl.
*H02M 1/42*      (2007.01)
*H02M 7/217*    (2006.01)
*H02M 1/08*      (2006.01)
*H02M 1/00*      (2006.01)

(52) U.S. Cl.
CPC .......... *H02M 1/4225* (2013.01); *H02M 1/083* (2013.01); *H02M 2001/0032* (2013.01); *Y02B 70/126* (2013.01); *Y02B 70/16* (2013.01); *Y02P 80/112* (2015.11)

(58) Field of Classification Search
CPC ............ H02M 1/4208; H02M 1/4225; H02M 2001/0032; H02M 7/217; H02M 1/083; Y02B 70/126; Y02B 70/16; Y02P 80/112
See application file for complete search history.

(56) References Cited

U.S. PATENT DOCUMENTS

| 5,267,138 | A | * | 11/1993 | Shores | ................ | H02M 3/3376 363/132 |
| 5,757,635 | A | * | 5/1998 | Seong | ................ | H02M 1/4225 323/222 |
| 5,818,707 | A | * | 10/1998 | Seong | ................ | H02M 1/4225 323/210 |
| 2010/0165683 | A1 | * | 7/2010 | Sugawara | ........... | H02M 1/4225 363/126 |
| 2011/0095733 | A1 | * | 4/2011 | Park | .................... | H02M 1/4225 323/207 |

(Continued)

FOREIGN PATENT DOCUMENTS

JP         2013-509141         3/2013

*Primary Examiner* — Fred E Finch, III
*Assistant Examiner* — Demetries A Gibson

(57) ABSTRACT

A switching power supply circuit including a phase angle detector circuit detecting a phase angle specified in advance based on a peak hold signal, a continuous conduction control setting circuit holding a voltage value corresponding to a peak current value of an inductor current detection voltage in every switching cycle and during a one-shot pulse when the peak is held and outputting a signal at the point of detection to determine to enable or disable a second set pulse set by the continuous conduction control setting circuit. When the second set pulse is disabled, a selector circuit carries out control using critical conduction control to turn on a switching element using a ZCD comparator detecting that the inductor current has reached zero, because of which the peak current does not increase.

12 Claims, 13 Drawing Sheets

(56) References Cited

U.S. PATENT DOCUMENTS

| | | | |
|---|---|---|---|
| 2011/0102950 A1* | 5/2011 | Park | H02M 1/4225 |
| | | | 361/18 |
| 2012/0201063 A1 | 8/2012 | Sugawara | |
| 2012/0250362 A1* | 10/2012 | Chen | H02M 1/4258 |
| | | | 363/21.03 |
| 2013/0194845 A1* | 8/2013 | Bianco | H02M 1/4225 |
| | | | 363/90 |
| 2014/0085949 A1* | 3/2014 | Sugawara | H02M 1/4225 |
| | | | 363/89 |

* cited by examiner

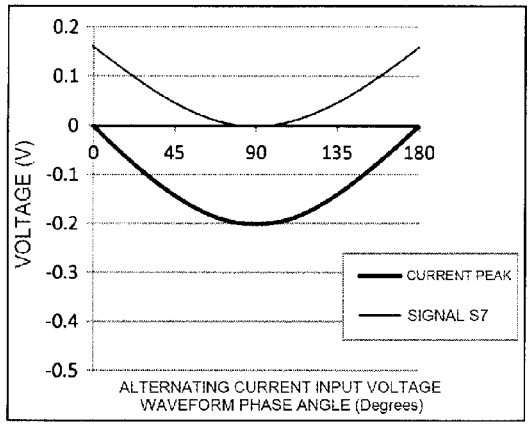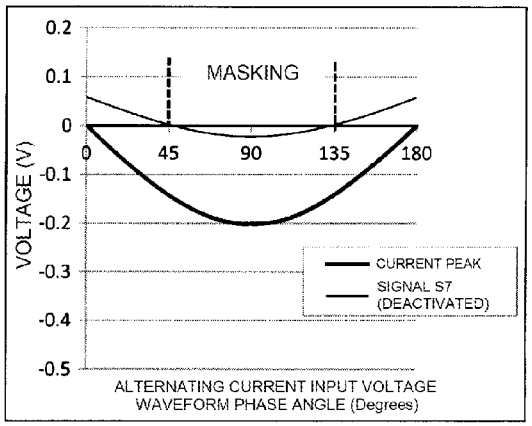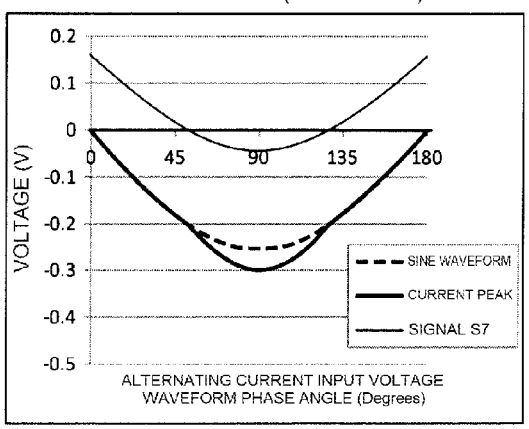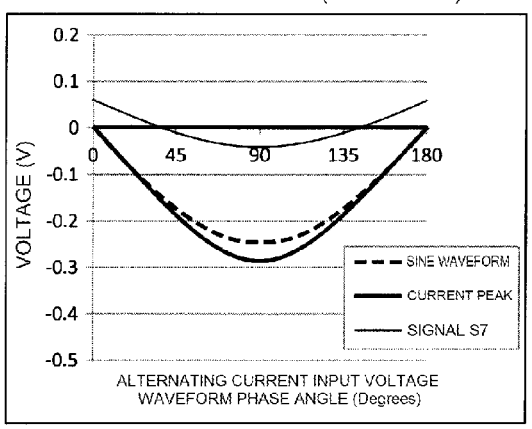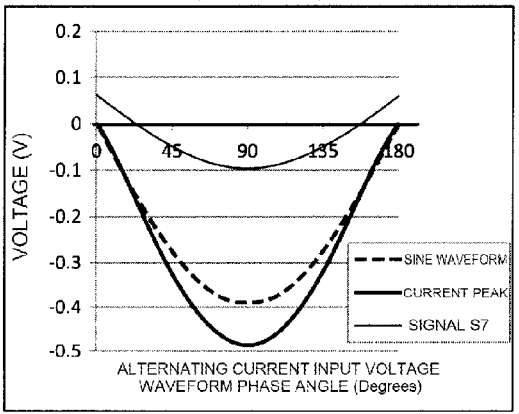

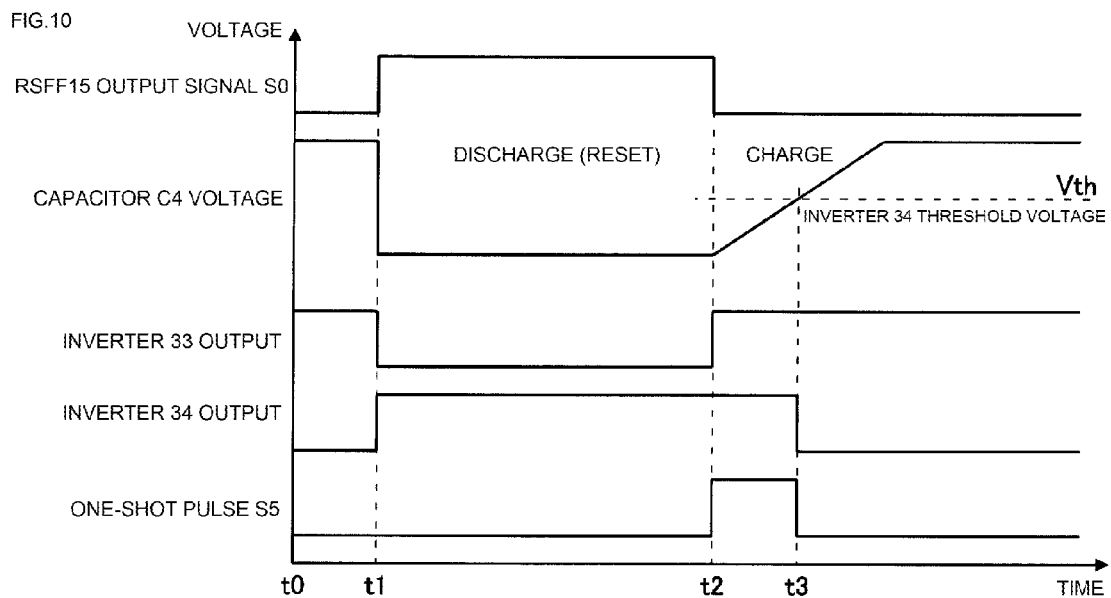

PEAK HOLD CIRCUIT 40 OPERATION WAVEFORMS

SET PULSE GENERATOR CIRCUIT 50 OPERATION WAVEFORMS

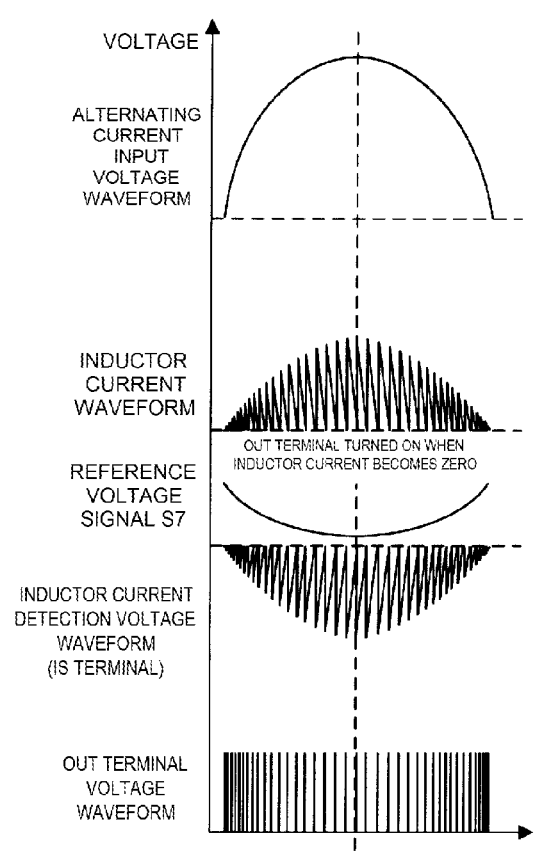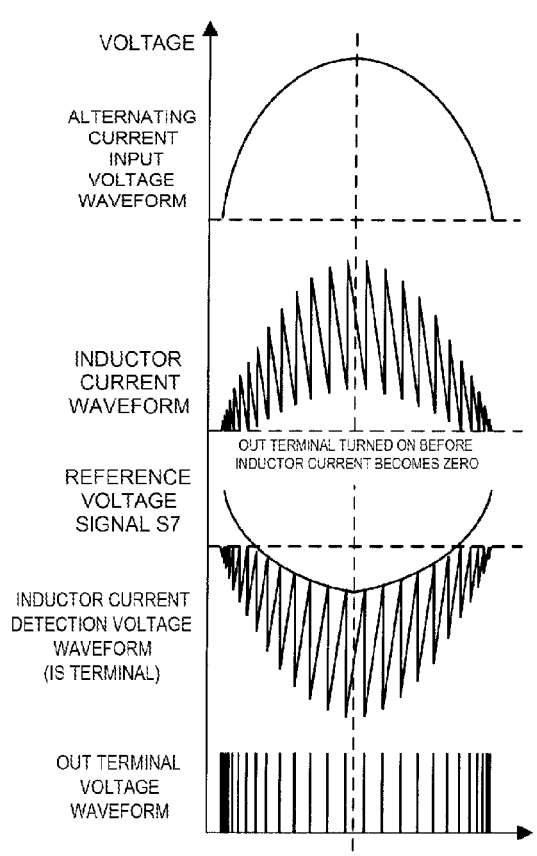

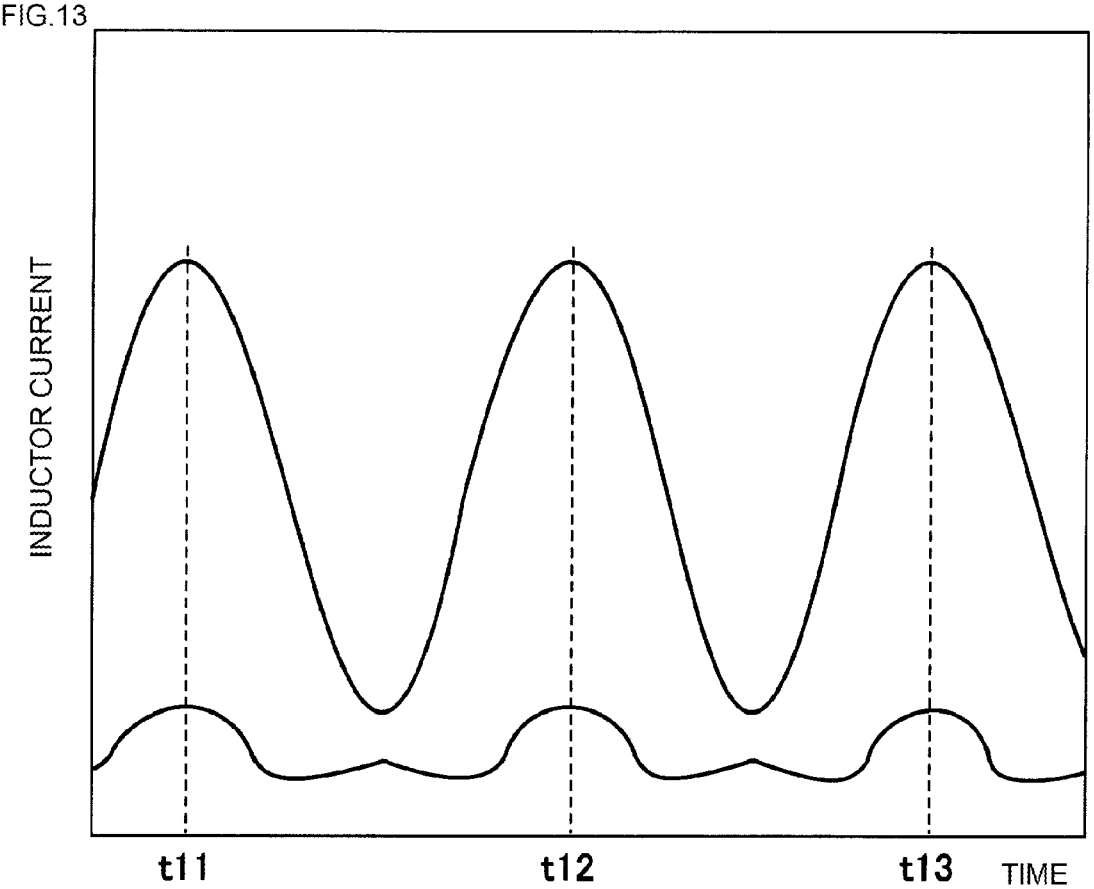

SWITCHING POWER SUPPLY CIRCUIT AND POWER FACTOR CORRECTION CIRCUIT

CROSS-REFERENCE TO RELATED APPLICATIONS

This application claims benefit of foreign priority to Japanese Application 2015-028520 filed on Feb. 17, 2015, the disclosure of which is incorporated herein by reference.

BACKGROUND

1. Field

The present disclosure relates to a switching power supply circuit and power factor correction circuit that convert an alternating current input voltage to a predetermined direct current output voltage and supply the output voltage to a load, and in particular, relates to a switching power supply circuit and power factor correction circuit such that switching can be carried out between a critical conduction control method and a continuous conduction control method.

2. Related Art

A switching power supply circuit is used in many electronic instruments to which a commercial alternating current power supply (100V to 240V AC) is supplied in order to obtain a direct current power supply that drives an internal electronic circuit. Therefore, a rectifier circuit that converts a commercial alternating current power supply to direct current is needed in the switching power supply circuit. A rectifier circuit has a problem in that current flows into a smoothing capacitor connected to a latter stage of the rectifier circuit only when the input voltage reaches the vicinity of a peak exceeding the voltage of the smoothing capacitor, because of which a high frequency current component is generated, forming a high frequency noise source, and the power factor decreases.

The power factor is a value that is the input effective power, which is the time average of the product of the input voltage and input current in an alternating current circuit, divided by the apparent power, which is the product of the effective value of the input voltage and the effective value of the input current, wherein the effective power is obtained by multiplying a coefficient (power factor) determined by the load by the apparent power. When a simple resistance load is connected to a 100 volt (V) alternating current, the voltage waveform and current waveform are in phase, and the power factor is 1. However, a switching power supply is such that the current phase deviates from the voltage phase due to load factors other than resistance, such as a capacitor or choke coil. In this case, it is necessary to increase the input current in order to compensate for the power factor decreasing by an amount commensurate with the deviation, which increases the power loss in the input line leading to the rectifier circuit. Therefore, it is necessary to prevent a decrease in power factor, thereby suppressing power loss, and to restrict the high frequency noise, using a power factor correction (PFC) circuit.

Broadly speaking, there are two methods of controlling a power factor correction circuit, those being a continuous conduction control method and a critical conduction control method. A critical conduction control method is a control method whereby the timing at which an inductor current flowing through an inductor becomes zero is detected, and a switching element is turned on at that timing. The critical conduction control method is such that, as a switching element is turned on by an inductor current reaching zero being detected, soft switching can be realized, turn-on loss is smaller than in the case of the continuous conduction control method, which involves hard switching, and efficiency is good. However, the critical conduction control method is such that the peak value of the inductor current is higher than the peak value in the case of the continuous conduction control method, and it is necessary to increase the inductor current capacity. Therefore, the critical conduction control method is characterized by being used in a power factor correction circuit of a switching power supply circuit with low power consumption in the region of, for example, 250 watts (W) or less, but not being appropriate to a power factor correction circuit of a switching power supply circuit of a larger capacity.

A power factor correction circuit is a circuit that corrects in such a way as to bring the power factor closer to 1 in a switching power supply circuit by bringing an alternating current input current waveform in phase with an alternating current input voltage waveform rectified by a rectifier circuit. Furthermore, the power factor correction circuit restricts the generation of harmful electro-magnetic interference (EMI) and high frequency current or voltage that leads to instrument destruction.

The continuous conduction control method and critical conduction control method have separate characteristics, but a power factor correction circuit wherein the heretofore described problems are addressed by the two methods being combined is known (for example, refer to Japanese Patent Application No. 2013-509141). The power factor correction circuit shown in 2013-509141 operates by switching between the critical conduction control method and continuous conduction control method when there is a heavy load.

FIG. 8 is a circuit diagram showing a switching power supply circuit in which is used a power factor correction circuit wherein switching between a critical conduction control method and continuous conduction control method can be carried out. In the following description, the same reference sign may be used for a terminal name and the voltage, a signal, and the like, of the terminal.

In the switching power supply circuit of FIG. 8, an alternating current input voltage is full-wave rectified by a full-wave rectifier circuit 1, one end of a capacitor 2 is connected to an output port of the full-wave rectifier circuit 1, and a high frequency component caused by a switching operation of a switching element 4, to be described hereafter, is removed by the capacitor 2. Furthermore, a step-up circuit including an inductor 3, the switching element 4 formed of a metal-oxide-semiconductor field effect transistor (MOSFET), a diode 5, and a capacitor 6 is connected to the output port of the full-wave rectifier circuit 1. By rectified voltage output from the full-wave rectifier circuit 1 being boosted and rectified by the step-up circuit, a direct current output voltage of, for example, approximately 400V can be supplied to a load (not shown) connected between a power supply output terminal 7 and the ground.

A power factor correction circuit 100 is configured of an integrated circuit wherein various kinds of function are integrated, and corrects a power factor by causing the inductor current and input voltage in the step-up circuit to be in-phase.

The power factor correction circuit 100 has an FB terminal, an IS terminal, an OUT terminal, an RT terminal, and a COMP terminal as external connection terminals. The FB terminal is a terminal for inputting a feedback signal that feeds back output voltage. The IS terminal, a current detecting resistor R3 being connected between the IS terminal and the ground, is a terminal for converting current flowing into the switching element 4 into negative voltage and detecting current flowing into the inductor 3. The OUT terminal is a terminal for the gate drive output of the MOSFET configuring the switching element 4, and controls the turning on and turning off of the MOSFET. The RT terminal, a timing resistor R1 of which one end is connected to the ground being connected thereto, is a terminal for connecting a resistor that determines an oscillation waveform, and is a terminal for generating a sawtooth foam oscillation output having an inclination in accordance with the resistance value of the timing resistor R1. The COMP terminal is a terminal for connecting a phase compensation element, and is connected to the ground via a capacitor C1, and a series circuit of a resistor R6 and a capacitor C2 is connected in parallel to the capacitor C1. The capacitors C1 and C2 and resistor R6 configure a phase compensation circuit. Additionally, an unshown power supply voltage input VCC terminal, an unshown ground connection GND terminal, and the like, are included in the power factor correction circuit 100.

An error amplifier 11, which amplifies and outputs the difference between the detected value of output voltage input into the FB terminal and a reference voltage Vref, and a pulse width modulation (PWM) comparator 12 are provided in the interior of the power factor correction circuit 100. The power factor correction circuit 100 also has an oscillator 13, a level conversion circuit 20, a continuous conduction control setting circuit 30, a zero current detection (ZCD) comparator 16, OR circuits 14a and 14b, and an RS flip-flop 15. The power factor correction circuit 100 further has an overvoltage protection (OVP) comparator 18 for protecting against overvoltage, and an overcurrent protection (OCP) comparator 19 for detecting an overcurrent.

The drain terminal of the switching element 4 is connected to a connection point of the inductor 3 and diode 5, while the source terminal is connected to the ground of the power factor correction circuit 100. The power supply output terminal 7 is connected to the ground via serially connected resistors R4 and R5, and a connection point of the resistors R4 and R5 is connected to the FB terminal.

The switching power supply circuit with the heretofore described configuration is such that the power factor is corrected by causing the inductor current and input voltage in the step-up circuit to be in-phase by the power factor correction circuit 100. Hereafter, details of an operation of the switching power supply circuit will be described.

In the power factor correction circuit 100, the error amplifier 11 is formed of a transconductance amplifier, and receives the reference voltage Vref in a non-inverting input terminal thereof, while the FB terminal is connected to an inverting input terminal. Therefore, the power factor correction circuit 100 controls so that the voltage of the FB terminal becomes equal to the reference voltage Vref. The voltage of the power supply output terminal 7 divided by the resistors R4 and R5 is input into the FB terminal. The output of the error amplifier 11 is connected to the COMP terminal and an inverting input terminal of the PWM comparator 12.

The capacitor C1, resistor R6, and capacitor C2 for configuring the phase compensation circuit are connected to the COMP terminal, and smooth a ripple component corresponding to a change in the alternating current input voltage.

The output waveform of the oscillator 13 is input into a non-inverting input terminal of the PWM comparator 12. The oscillator 13 is connected to the external timing resistor R1 via the RT terminal, from which a constant voltage is output, and generates a sawtooth form oscillation output having an inclination in accordance with the timing resistor R1 by charging a built-in capacitor, with the value of current flowing in accordance with the resistance value of the timing resistor R1 as a reference. When the output waveform of the oscillator 13 exceeds the voltage of the COMP terminal, the output of the PWM comparator 12 outputs a reset signal to the RS flip-flop 15 via the OR circuit 14a. Therefore, an OUT terminal of the RS flip-flop 15 switches to a low (L) level, whereby the switching element 4 is switched to a turned off state.

Furthermore, the outputs of the OVP comparator 18 for protection against overvoltage and the OCP comparator 19 for protection against overcurrent are connected to the OR circuit 14a.

The OVP comparator 18 for protection against overvoltage receives a reference voltage Vovp in an inverting input terminal side, while the FB terminal is connected to a non-inverting input terminal side. When the FB terminal voltage, in which the power supply output voltage is reflected, exceeds the reference voltage Vovp, the output of the OVP comparator 18 for protection against overvoltage switches to a high (H) level, thereby resetting the RS flip-flop 15.

Also, the OCP comparator 19 for protection against overcurrent receives a reference voltage Vocp in a non-inverting input terminal side, while the level conversion circuit 20 connected to the IS terminal is connected to an inverting input terminal side, whereby the OCP comparator 19 receives a second current level signal S2. The output of the OCP comparator 19 for protection against overcurrent is connected to a reset terminal of the RS flip-flop 15 via the OR circuit 14a, and outputs at an H level when the second current level signal S2 is lower than the reference voltage Vocp, thereby resetting the RS flip-flop 15. The second current level signal S2 is a signal that decreases further the greater the current flowing into the resistor R3, as will be described hereafter.

First to third current level signals S1, S2, and S3 output from the level conversion circuit 20 connected to the IS terminal are such that signals of differing values of voltage between a reference voltage Vref2 and the IS terminal being resistively divided are output. The first and second current level signals S1 and S2 of the level conversion circuit 20 are input into the continuous conduction control setting circuit 30, and the continuous conduction control setting circuit 30 generates a second set pulse S8 (a continuous conduction control turn-on signal) supplied to the RS flip-flop 15 via the OR circuit 14b.

Also, an output signal of the ZCD comparator 16, to which the third current level signal S3 is supplied, is input via the OR circuit 14b into a set terminal of the RS flip-flop 15 as a first set pulse, which is a critical conduction control turn-on signal. Generation of the first to third current level signals S1, S2, and S3 and the second set pulse S8 signal will be illustrated hereafter in FIG. 9.

The first set pulse, which is the output signal of the ZCD comparator 16, and the second set pulse S8 are input into the OR circuit 14b, and the OR circuit 14b sets the RS flip-flop 15 at the timing of whichever of the signals reaches the H level first, thereby switching the OUT terminal to a turn-on state H level.

FIG. 9 is a circuit diagram showing a specific configuration of the level conversion circuit and continuous conduction control setting circuit configuring the power factor correction circuit.

As shown in FIG. 9, the level conversion circuit 20 is configured of four resistors R21 to R24 connected in series, wherein one end is connected to the positive reference voltage Vref2, while the other end is connected to the IS terminal. The current detecting resistor R3 configuring an inductor current detector circuit is connected to the IS terminal, and when current flows into the current detecting resistor R3, the detected voltage of an inductor current of negative voltage, whose inductor current has been detected, is supplied.

In the level conversion circuit 20, input voltage from the IS terminal is shifted to a positive voltage side of polarity the reverse that of the detected voltage of the inductor current. Therefore, the level conversion circuit 20 converts the inductor current flowing into the inductor 3 into the first to third current level signals S1, S2, and S3 proportional to the inductor current, and outputs the first to third current level signals S1, S2, and S3 at mutually differing voltage levels. Herein, "proportional" is used to mean that the output is a linear function of the input.

The first current level signal S1 is output from a connection point of the resistors R21 and R22 on the reference voltage Vref2 side, and supplied to the continuous conduction control setting circuit 30. Also, the second current level signal S2 is output from a connection point of the intermediate resistors R22 and R23, and supplied to each of the OCP comparator 19 for protection against overcurrent and continuous conduction control setting circuit 30 of the power factor correction circuit 100. Furthermore, the third current level signal S3 is output from a connection point of the resistors R23 and R24 on the IS terminal side, and supplied to the ZCD comparator 16 of the power factor correction circuit 100.

The ZCD comparator 16 functions as a zero current detector circuit that detects the current flowing into the inductor 3 reaching zero by comparing the third current level signal 3 with a reference voltage Vzcd.

As shown in FIG. 9, the continuous conduction control setting circuit 30 includes a peak hold circuit 40 and a set pulse generator circuit 50, wherein the second set pulse S8 generated in the set pulse generator circuit 50 is output to the OR circuit 14b shown in FIG. 8.

The second set pulse S8 functions so as to change the turn-on timing of the switching element 4 in response to a heavy load to the timing at which a zero current is detected or earlier, and switch the control method from critical conduction control to continuous conduction control when there is a heavy load.

In the continuous conduction control setting circuit 30, an output signal S0 of the RS flip-flop 15 shown in FIG. 8 and the first current level signal S1 of the level conversion circuit 20 are input into the peak hold circuit 40. Further, a peak level signal S6 is generated from the first current level signal S1 in the peak hold circuit 40, and the second set pulse S8, which regulates the turn-on timing of the switching element 4, is generated in the set pulse generator circuit 50.

The peak hold circuit 40 includes a one-shot circuit 41, a transfer gate 42, and a hold circuit 43. The one-shot circuit 41 has a MOSFET 31, a constant current supply 32, a capacitor C4, inverters 33 and 34, a NAND circuit 35, and an inverter 36, and generates one-shot pulses S4 and S5 in synchronization with the turn-off timing of the switching element 4. In the peak hold circuit 40, the output signal S0 of the RS flip-flop 15 is supplied to a gate terminal of the MOSFET 31, whereby the MOSFET 31 is turned on and off. Therefore, the capacitor C4 connected in parallel to the MOSFET 31 operates so as to repeat discharge by the MOSFET 31 and charging by the constant current supply 32. The output signal S0 of the RS flip-flop 15 is input into the inverter 33, and an input terminal of the inverter 34 is connected to a connection point of the capacitor C4 and constant current supply 32, whereby a charge voltage of the capacitor C4 is supplied. The output voltages of the two inverters 33 and 34 are both input into the NAND circuit 35, whereby the one-shot pulse S4 is generated. Furthermore, the one-shot pulse S4 generated in the NAND circuit 35 is inverted in the inverter 36, whereby one more reverse phase one-shot pulse S5 is generated.

The one-shot pulses S4 and S5 are supplied to an inverting input terminal and non-inverting input terminal respectively of the transfer gate 42. Herein, when the one-shot pulse S4 is at an L level and the one-shot pulse S5 is at an H level, the transfer gate 42 is in an on (conductive) state.

The hold circuit 43 is configured of a circuit wherein a resistor R7 and capacitor C3 are connected in series, holds the first current level signal S1 of the level conversion circuit 20 when the transfer gate 42 is in an on-state, and outputs the peak level signal S6.

The set pulse generator circuit 50 has an amplifier circuit (voltage follower) 51, a resistance circuit wherein two resistors R8 and R9 are connected in series, and a comparator circuit 52. The amplifier circuit 51 carries out impedance conversion of the peak level signal S6 generated in the peak hold circuit 40, and an output terminal thereof is connected via the resistors R8 and R9 to GND. Therefore, the amplifier circuit 51 outputs voltage equal to the peak level signal S6, and the voltage is divided by the resistors R8 and R9, whereby a reference voltage signal S7 is generated. The reference voltage signal S7 is supplied to an inverting input terminal of the comparator circuit 52, the second current level signal S2 is supplied from the level conversion circuit 20 to a non-inverting terminal, and the comparator circuit 52 compares the second current level signal S2 with the voltage level of the reference voltage signal S7. When the second current level signal S2 reaches a voltage exceeding the reference voltage signal S7, the comparator circuit 52 outputs the second set pulse S8, which is input via the OR circuit 14b into the set terminal of the RS flip-flop 15.

FIG. 10 is a timing diagram showing main portion signal waveforms of the one-shot circuit configuring the continuous conduction control setting circuit.

The one-shot circuit 41 is such that the output signal S0 of the RS flip-flop 15 is supplied, the output signal S0 is at an L level from a time t0 or earlier until a time t1, and the MOSFET 31 is in an off-state, as is the switching element 4. At this time, a charge current from the constant current supply 32 is flowing into the capacitor C4, because of which the capacitor C4 has already been charged to a predetermined voltage level (H level) at the time t0. Therefore, an H level is output from the inverter 33, into which the output signal S0 is input, to the NAND circuit 35 during the period from the time t0 to t1, while an L level is output to the NAND circuit 35 from the inverter 34. Therefore, the NAND circuit 35 outputs at an H level while the inverter 36 outputs at an L level, because of which the transfer gate 42 is in an off (interrupted) state.

Next, on the output signal S0 switching to an H level at the time t1, the MOSFET 31 is turned on, because of which the capacitor 4 is discharged, the input to the inverter 34 is immediately inverted to an L level, and the output signals of the two inverters 33 and 34 are also simultaneously inverted to L and H levels respectively. Despite this, the output of the NAND circuit 35 is held at the H level, because of which no change occurs in the off-state of the transfer gate 42.

Next, at a time t2 at which the output signal S0 returns to the L level, the inverter 33 immediately outputs at the H level. However, the input of the inverter 34 is such that, as the charge current from the constant current supply 32 only starts to flow into the capacitor C4, the output of the inverter 34 continues at the H level state. Therefore, the output of the NAND circuit 35 inverts from the H level to the L level, and the output of the inverter 36 inverts from the L level to the H level. Therefore, the one-shot circuit 41 is such that the one-shot pulses S4 and S5, at the L level and H level respectively, are input into the transfer gate 42.

In this way, the transfer gate 42 is in a conductive state in a period from the time t2 to a time t3 because of the one-shot pulses S4 and S5 generated as mutually complementary signals in the one-shot circuit 41, and the first current level signal S1 is input into the hold circuit 43.

In the hold circuit 43, the first current level signal S1 input via the transfer gate 42 is held as the peak level signal S6 in the capacitor C3. That is, the inductor current continues to increase while the switching element 4 is in an on-state, because of which the inductor current reaches a maximum value at the moment the switching element 4 is turned off, and the one-shot pulses S4 and S5 from the one-shot circuit 41 are generated immediately after the switching element 4 is turned off.

Consequently, the peak level signal S6, wherein the peak value of the first current level signal S1 corresponding to the peak value of the inductor current is sampled and held, is held in the hold circuit 43.

The one-shot circuit 41 is such that, when the time t3 is reached and the capacitor C4 is charged by the constant current supply 32 to exceed a threshold voltage Vth of the inverter 34, the output state of the inverter 34 inverts to the L level, the output of the NAND circuit 35 inverts from the L level to the H level, and the output of the inverter 36 inverts from the H level to the L level. Therefore, the transfer gate 42 switches to an off-state. That is, the pulse widths of the one-shot pulses S4 and S5 are regulated in the period from the time t2 to the time t3.

The period from the time t2 to the time t3 is shown to be fairly long in FIG. 10 for ease of understanding, but is actually set to as short a time as possible within a range in which the sampling and holding operation can be carried out.

FIGS. 11A and 11B are timing diagrams showing main portion signal waveforms of the continuous conduction control setting circuit, wherein FIG. 11A shows an operation waveform of the peak hold circuit, while FIG. 11B shows an operation waveform of the set pulse generator circuit.

FIG. 11A shows the output signal S0 input into the peak hold circuit 40, the one-shot pulse S5 formed at the timing at which the output signal S0 falls, the first current level signal S1, and the peak level signal S6 generated from the first current level signal S1.

As previously described, when inductor current flows into the current detecting resistor R3, the current detecting resistor R3 generates a negative inductor current detection voltage, and supplies the voltage to the IS terminal. Further, as the absolute value of the inductor current detection voltage increases further the greater the inductor current, the first current level signal S1 exhibits a characteristic of extending further to the lower side of FIG. 11A the greater the inductor current. Consequently, the lower the bottom peak value of the first current level signal S1 and peak level signal S6 shown in FIG. 11A, the greater the peak value of the inductor current in each switching cycle.

Also, as heretofore described, the power factor correction circuit 100 brings an alternating current input current waveform in the switching power supply circuit in phase with an alternating current input voltage waveform after rectification, because of which the waveform of the peak level signal S6 is practically the same as the alternating current input voltage waveform after rectification. That is, when there is a heavy load and a large amount of current flows into the switching element 4 and inductor 3, the peak level signal 6 generated from the first current level signal S1 changes with greater curvature.

FIG. 11B shows the reference voltage signal S7 and second current level signal S2 input into the comparator 52 as operation waveforms of the set pulse generator circuit 50, and the second set pulse S8 output from the set pulse generator circuit 50 as a comparison output in the comparator circuit 52.

The voltage levels of the reference voltage signal S7, which changes practically in phase with the alternating current input voltage after rectification, and second current level signal S2 are compared in the set pulse generator circuit 50. The reference voltage signal S7, which is a signal wherein the peak level signal S6 output from the peak hold circuit 40 is level-shifted (divided), as heretofore described, changes with greater curvature when there is a heavy load. Also, the second current level signal S2 changes in proportion to the inductor current flowing into the inductor 3, in the same way as the first current level signal S1, and differs from the first current level signal S1 only in voltage level.

When the second current level signal S2 rises and becomes equal to the reference voltage signal S7 in accompaniment to the switching element 4 being turned off and the inductor current decreasing, the second set pulse S8, which regulates the turn-on timing of the switching element 4, is output from the comparator circuit 52.

FIGS. 12A and 12B are diagrams showing signal waveforms of an operation of the power factor correction circuit, wherein FIG. 12A shows signal waveforms of a critical operation when there is a light load, while FIG. 12B shows signal waveforms of a continuous operation when there is a heavy load.

Herein, FIGS. 12A and 12B both show, with the alternating current input voltage waveform of the alternating current power supply as a reference, the inductor current waveform, the reference voltage signal S7 that changes practically in phase with the alternating current input voltage waveform, the voltage waveform of the inductor current detection voltage input into the IS terminal of the power factor correction circuit 100, and the voltage waveform of a signal output from the OUT terminal. The voltage waveform of the signal output from the OUT terminal in the diagram is such that the pulse width has no meaning, but the pulse interval is meaningful. The second current level signal S2 (the zero current detection level) when the inductor current reaches zero, that is, a value that is the top peak value of the inductor current detection voltage waveform in FIG. 12A after level shifting, is of the constant size shown below, regardless of the size of the load.

When Vzero=Vref2·(R23+R24)/(R21+R22+R23+R24), the bottom peak value of the inductor current detection voltage waveform when there is a light load is a negative voltage with a small absolute value, because of which the bottom of the waveform of the reference voltage signal S7 is positioned to the upper side of that in FIG. 12B, and the minimum value of the reference voltage signal S7 is greater than the zero current detection level. Consequently, when there is a light load, no second set pulse S8 is output, and the switching element 4 is turned on at the timing at which the ZCD comparator 16 detects that the inductor current is zero and outputs the first set pulse. In this case, the switching element 4 changes from an off-state to an on-state at the timing at which the inductor current becomes zero, because of which the power factor correction circuit 100 operates using the critical conduction control method.

Meanwhile, when the load is heavier, the reference voltage signal S7 is displaced downward with a large curvature, as shown in FIG. 12B, and at the point at which one portion of the reference voltage signal S7 becomes lower than the zero current detection level, the second set pulse S8 is output ahead of the first set pulse from the ZCD comparator 16. Therefore, the power factor correction circuit 100 is such that the control method switches from critical conduction control to continuous conduction control when there is a heavy load.

FIG. 13 is a diagram showing waveforms of the inductor current flowing in the switching power supply circuit when there is a heavy load.

FIG. 13 shows an envelope to which the maximum value of the inductor current is connected and an envelope to which the minimum value is connected. As illustrated in FIGS. 12A and 12B, the existing power factor correction circuit 100 is such that the size of the load is determined using the inductor current detection voltage, and switching between the critical conduction control method and continuous conduction control method is carried out. Therefore, it is seen that the critical conduction control method is used in a region in which the momentary value of the envelope waveform to which is connected the maximum value of the inductor current, which changes practically in phase with the alternating current input voltage waveform, is small (that is, an intermediate region between a time t11 and a time t12, and an intermediate region between the time t12 and a time t13), while the continuous conduction control method is used in a region in which the momentary value of the envelope waveform to which the maximum value is connected is large.

The previously described power factor correction circuit 100 is such that when the power supply output voltage is constant at 400V, the average value of the inductor current that oscillates up and down is proportional to the supply power of one switching cycle. Therefore, even in the case of an inductor of the same size as in the case of the existing critical conduction control, the power that can be supplied to the load under the same maximum peak current value condition can be set high by switching from the critical conduction control method to the continuous conduction control method when there is a heavy load, whereby a predetermined direct current voltage can be supplied to a greater load. Also, from a different viewpoint, when supplying the same power to the load, the same power can be supplied using continuous conduction control in a state lower than the peak current when using critical conduction control.

SUMMARY

In the case of switching from critical conduction control to continuous conduction control described thus far, continuous conduction control starts from a high-voltage portion of the alternating current input waveform as the load becomes heavier. When the load becomes heavier, the ratio of offset current, which is a continuous current component of continuous conduction control, increases as the alternating current input voltage becomes higher, and the current when turning on increases. Therefore, when operating at a constant ON width set in accordance with the voltage of the COMP terminal, the portion of offset current that has become continuous current as the alternating current input voltage becomes higher is added, and the peak current increases. As a result of this, there is a problem in that the current waveform distorts from a sine waveform to a waveform with a high peak with respect to the sine waveform of the alternating current input voltage, because of which the power factor worsens.

When this is seen in the inductor current waveform of FIG. 13, the inductor current peak is high in a portion of continuous conduction control, and distortion occurs in that the current waveform peak is high in the 90° high phase angle portion at the times t11, t12, and t13, and of a pointed form a little ahead. In the disclosure, the terminology "high phase angle" is used to mean a phase angle at which the alternating current input voltage waveform after rectification is particularly high, and a phase angle in the vicinity thereof.

An aspect of this disclosure, having been contrived in consideration of this point, is to provide a switching power supply circuit and power factor correction circuit such that there is a decrease in current waveform distortion and worsening power factor due to peak current increasing under continuous conduction control in a high phase angle portion of the alternating current input waveform.

In order to resolve the heretofore described problem, the disclosure provides a switching power supply circuit that has a rectifier circuit that full-wave rectifies an alternating current power supply to obtain a pulsating output, an inductor connected to the rectifier circuit, a switching element, and an output capacitor, generates direct current output voltage of a predetermined size from the alternating current power supply, and supplies the direct current output voltage to a load. The switching power supply circuit includes a phase angle detector circuit that detects the phase angle of the alternating current power supply, an inductor current detector circuit that detects current flowing into the inductor and outputs inductor current detection voltage, a level conversion circuit that converts the inductor current detection voltage into first and second current level signals of mutually differing voltage levels, a continuous control setting circuit that generates a set pulse regulating the turn-on timing of the switching element by generating a reference voltage signal that changes practically in phase with an alternating current input voltage waveform full-wave rectified from the first current level signal and comparing the reference voltage signal with the voltage level of the second current level signal, a zero current detector circuit that detects that current flowing into the inductor has reached zero, and a turn-on timing selector circuit that determines which is the earlier of a signal of the turn-on timing of the switching element regulated by the continuous control setting circuit and a signal of the timing at which the zero current detector circuit detects that current flowing into the inductor has reached zero, and selects one of the turn-on timing of the switching element regulated by the continuous control setting circuit and the timing at which the zero current detector circuit detects that current flowing into the inductor has reached zero using the result of the determination, and is characterized in that the phase angle detector circuit sets enable or disable of the turn-on timing regulated by the continuous control setting circuit based on the result of the determination by the turn-on timing selector circuit at the point of a phase angle specified in advance, and the turn-on timing selector circuit switches the switching element to an on-state with the set pulse regulating the turn-on timing generated by the continuous control setting circuit only when the phase angle detector circuit sets enable of the turn-on timing regulated by the continuous control setting circuit.

Also, the disclosure provides a power factor correction circuit of a switching power supply circuit that has a rectifier circuit that full-wave rectifies an alternating current power supply to obtain a pulsating output, an inductor connected to the rectifier circuit, a switching element, an output capacitor, and an inductor current detector circuit that detects current flowing into the inductor and outputs inductor current detection voltage, generates direct current output voltage of a predetermined size from the alternating current power supply, and supplies the direct current output voltage to a load. The power factor correction circuit includes a phase angle detector circuit that detects the phase angle of the alternating current power supply, a level conversion circuit that converts the inductor current detection voltage into first and second current level signals of mutually differing voltage levels, a continuous control setting circuit that generates a set pulse regulating the turn-on timing of the switching element by generating a reference voltage signal that changes practically in phase with an alternating current input voltage waveform full-wave rectified from the first current level signal and comparing the reference voltage signal with the voltage level of the second current level signal, a zero current detector circuit that detects that current flowing into the inductor has reached zero, and a turn-on timing selector circuit that determines which is the earlier of a signal of the turn-on timing of the switching element regulated by the continuous control setting circuit and a signal of the timing at which the zero current detector circuit detects that current flowing into the inductor has reached zero, and selects one of the turn-on timing of the switching element regulated by the continuous control setting circuit and the timing at which the zero current detector circuit detects that current flowing into the inductor has reached zero using the result of the determination, and is characterized in that the phase angle detector circuit sets enable or disable of the turn-on timing regulated by the continuous control setting circuit based on the result of the determination by the turn-on timing selector circuit at the point of a phase angle specified in advance, and the turn-on timing selector circuit switches the switching element to an on-state with the set pulse regulating the turn-on timing generated by the continuous control setting circuit only when the phase angle detector circuit sets enable of the turn-on timing regulated by the continuous control setting circuit.

The switching power supply circuit and power factor correction circuit of the heretofore described configuration have an advantage in that current waveform distortion and worsening power factor due to peak current increasing under continuous conduction control in a high phase angle portion can be reduced by masking a switch to continuous conduction control in a high phase angle portion of the alternating current input waveform.

BRIEF DESCRIPTION OF THE DRAWINGS

These and/or other aspects and advantages will become apparent and more readily appreciated from the following description of the embodiments, taken in conjunction with the accompanying drawings of which:

FIGS. 7A through 7E are diagrams comparing current peak and a reference voltage signal wherein a peak hold signal has been divided in the existing example and the embodiment, wherein FIG. 7A shows a time of maximum current during critical control in the existing example, FIG. 7B shows a time of maximum current during critical control in the embodiment, FIG. 7C shows a time of medium load in the existing example, FIG. 7D shows a time of medium load in the embodiment, and FIG. 7E shows a time of a heavy load in the existing example and the embodiment;

FIG. 10 is a timing diagram showing main portion signal waveforms of a one-shot circuit configuring a continuous conduction control setting circuit;

FIGS. 11A and 11B are timing diagrams showing main portion signal waveforms of the continuous conduction control setting circuit, wherein FIG. 11A shows an operation waveform of a peak hold circuit, while FIG. 11B shows an operation waveform of a set pulse generator circuit;

FIGS. 12A and 12B are diagrams showing signal waveforms of an operation of the power factor correction circuit, wherein FIG. 12A shows signal waveforms of a critical operation when there is a light load, while FIG. 12B shows signal waveforms of a continuous operation when there is a heavy load; and FIG. 13 is a diagram showing waveforms of an inductor current flowing in the switching power supply circuit when there is a heavy load.

DESCRIPTION OF EMBODIMENTS

Figure 1:
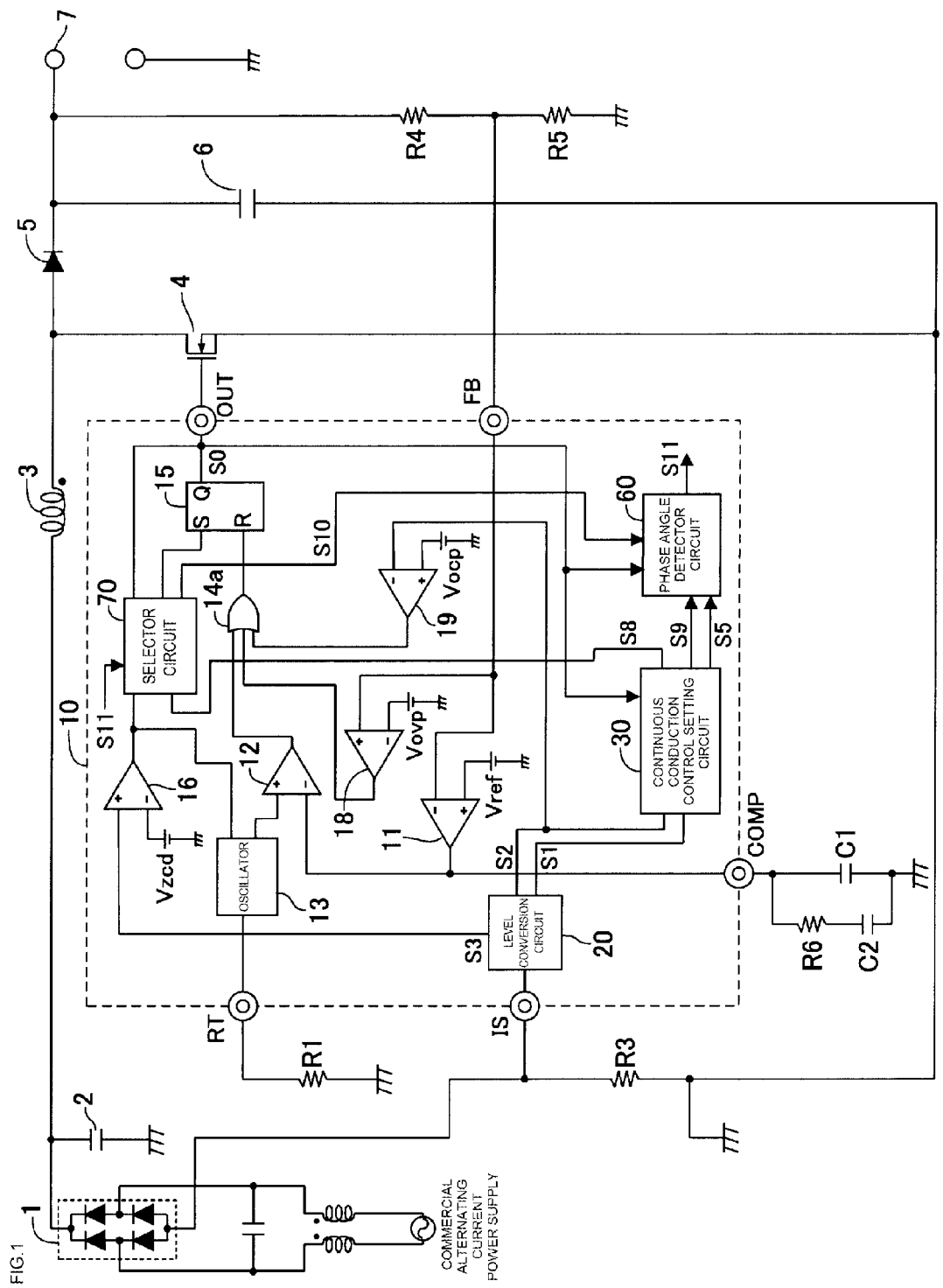
FIG. 1 is a circuit diagram showing a switching power supply circuit according to an embodiment of the disclosure.

Hereafter, referring to the drawings, a detailed description will be given of an embodiment of the disclosure.

Figure 2:
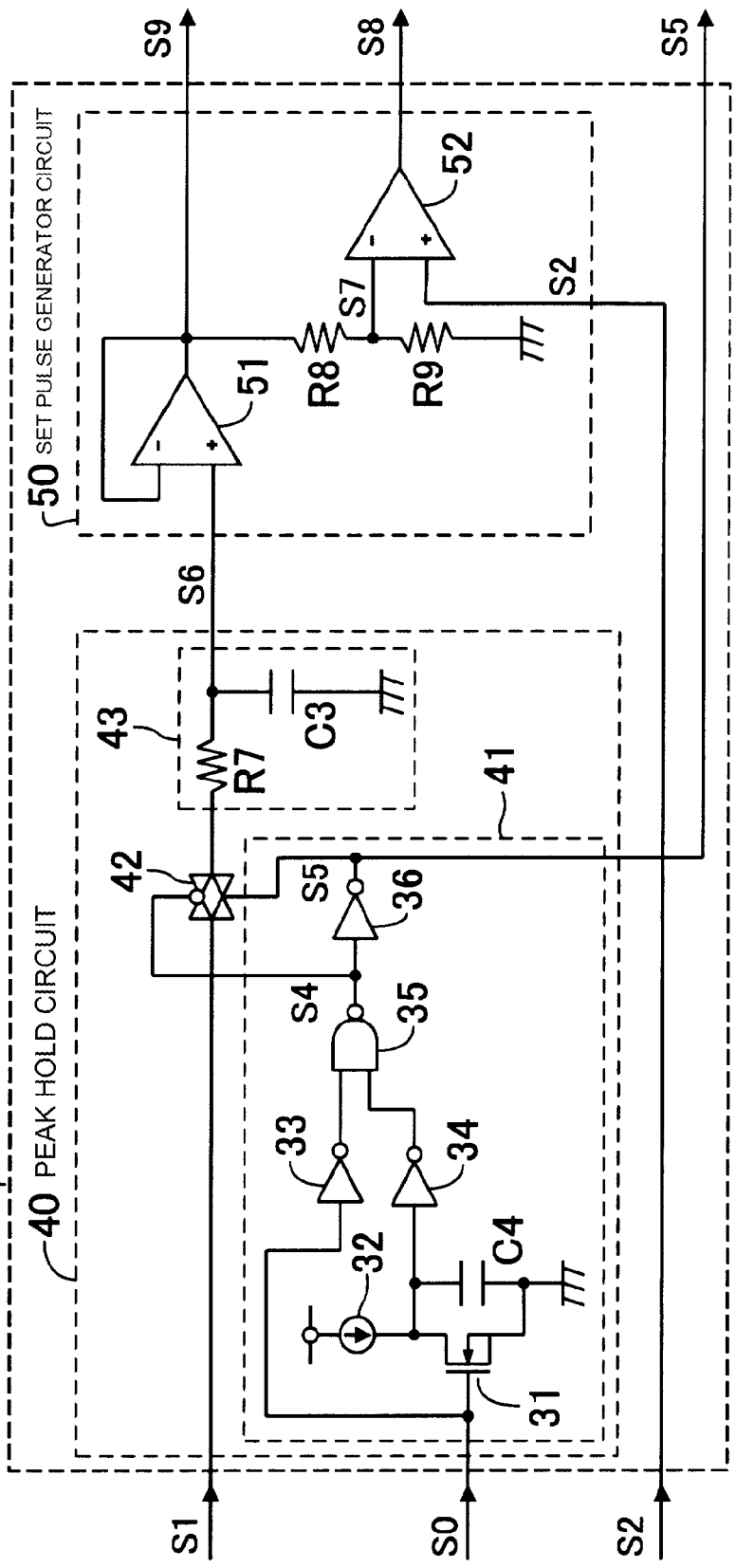
FIG. 2 is a circuit diagram showing a configuration example of a continuous conduction control setting circuit.
Figure 8:
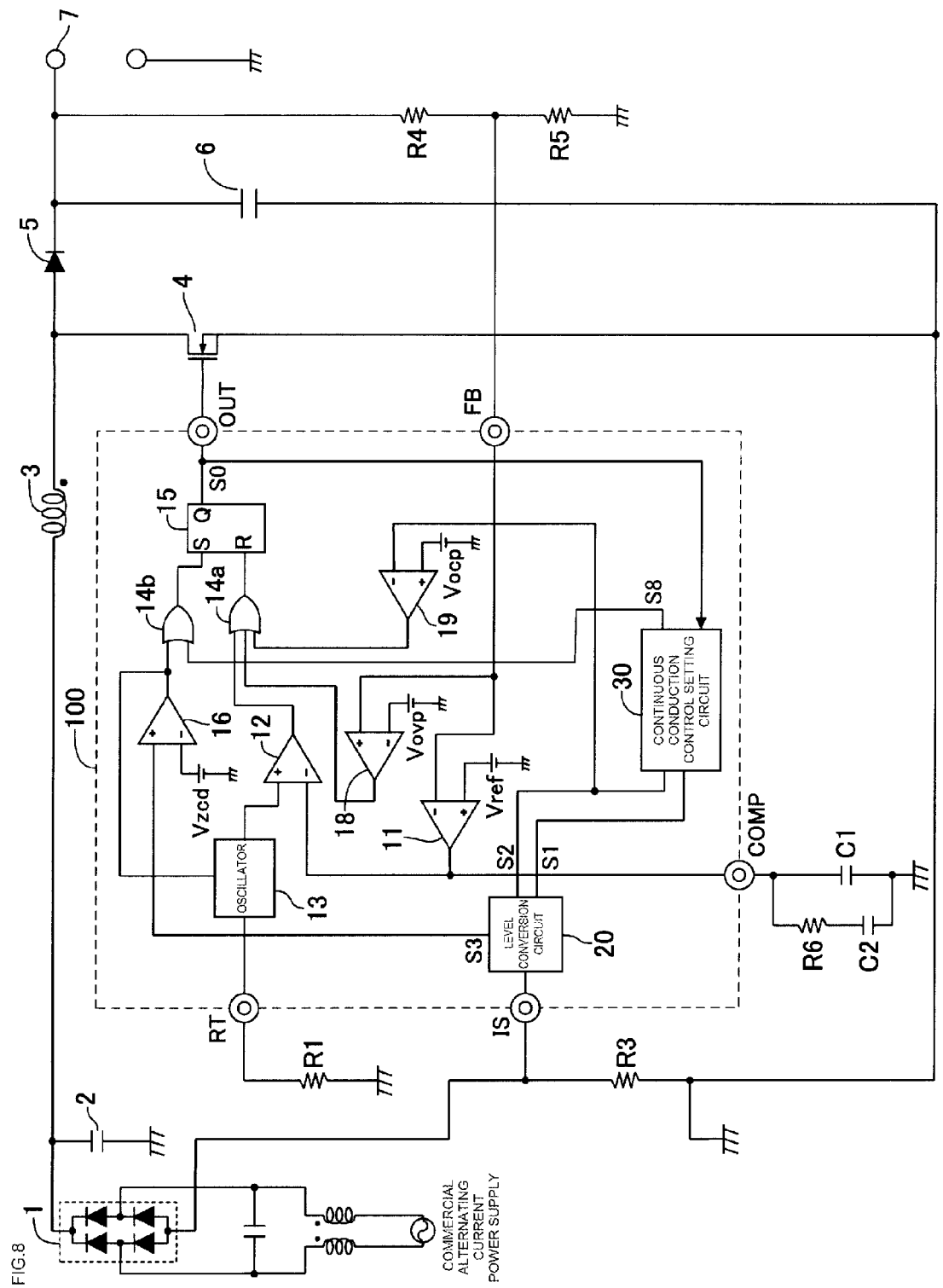
FIG. 8 is a circuit diagram showing a switching power supply circuit in which is used a power factor correction circuit wherein switching between a critical conduction control method and continuous conduction control method can be carried out.

FIG. 1 is a circuit diagram showing a switching power supply circuit according to an embodiment of the disclosure, while FIG. 2 is a circuit diagram showing a configuration example of a continuous conduction control setting circuit. Hereafter, the same reference signs will be used for components, terminal names, signal names, and the like, corresponding to circuits shown in FIG. 8 and FIG. 9, which are existing examples, and redundant descriptions will be omitted.

A switching power supply circuit shown in FIG. 1 has a full-wave rectifier circuit 1, which full-wave rectifies an alternating current power supply to obtain a pulsating output, and an inductor 3 connected to the full-wave rectifier circuit 1, and supplies direct current output voltage of a predetermined size from the alternating current power supply to a load. In the switching power supply circuit, a power factor correction circuit 10 differs from a power factor correction circuit 100 of an existing switching power supply circuit of FIG. 8 in that a phase angle detector circuit 60 and a selector circuit (turn-on timing selector circuit) 70 are added. The phase angle detector circuit 60 is for detecting the phase angle of alternating current input voltage, while the selector circuit 70 is for determining which of a critical current control turn-on signal (a first set pulse) and a continuous current control turn-on signal (a second set pulse S8) has been input first.

Figure 9:
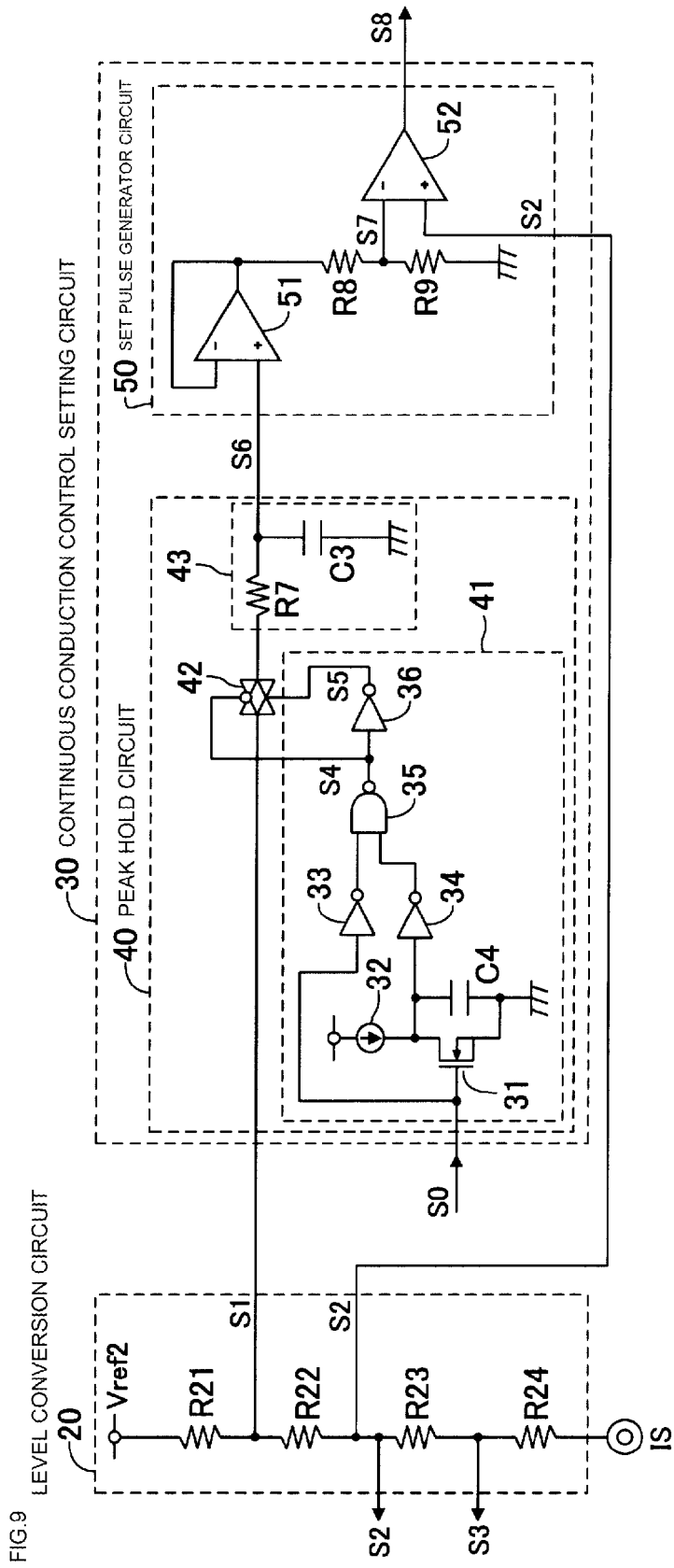
FIG. 9 is a circuit diagram showing a specific configuration of a level conversion circuit and continuous conduction control setting circuit configuring the power factor correction circuit.
Figure 11A:
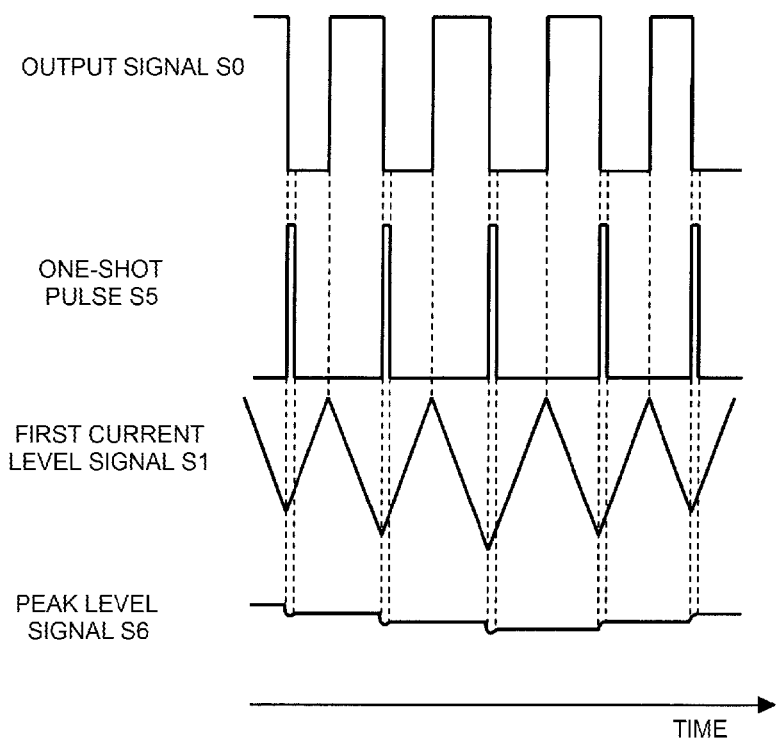
Figure 11B:
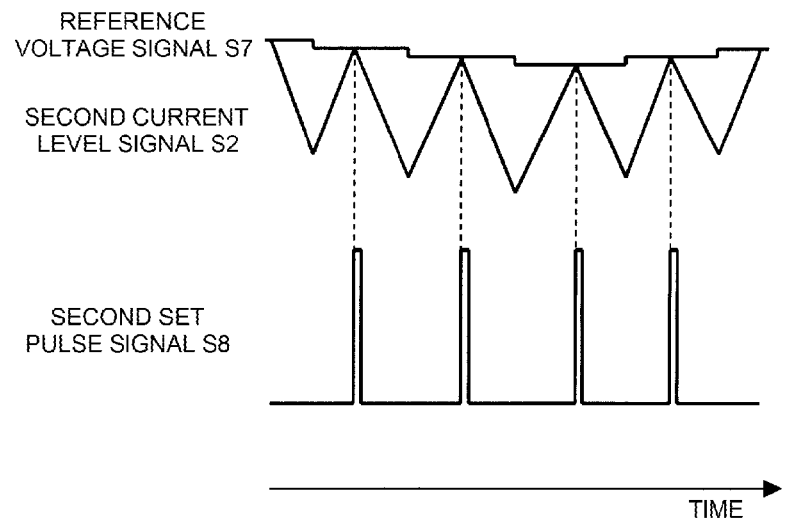

As shown in FIG. 2, a continuous conduction control setting circuit 30 is of the same configuration as an existing circuit shown in FIG. 9, but additionally outputs a one-shot pulse S5 and a peak hold signal S9, and supplies the one-shot pulse S5 and peak hold signal S9 to the phase angle detector circuit 60.

The one-shot pulse S5 and peak hold signal S9 from the continuous conduction control setting circuit 30, an output signal S0 of an RS flip-flop 15, and a signal S10 from the selector circuit 70 are input into the phase angle detector circuit 60. Also, the phase angle detector circuit 60 generates a signal S11 that determines whether or not continuous conduction control is to be carried out, and supplies the signal S11 to the selector circuit 70.

Figure 3:
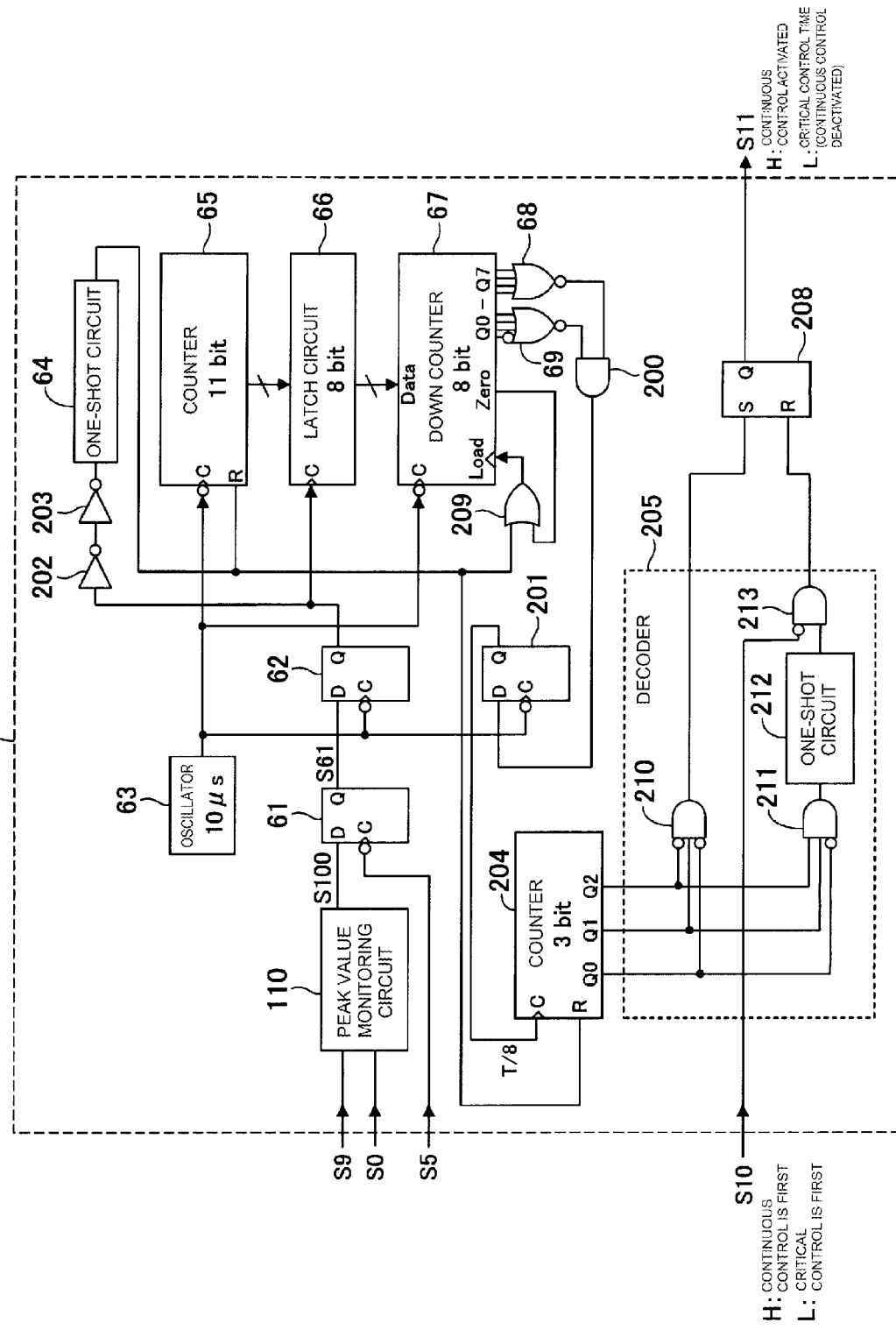
FIG. 3 is a circuit diagram showing a configuration example of a phase angle detector circuit.
Figure 4:
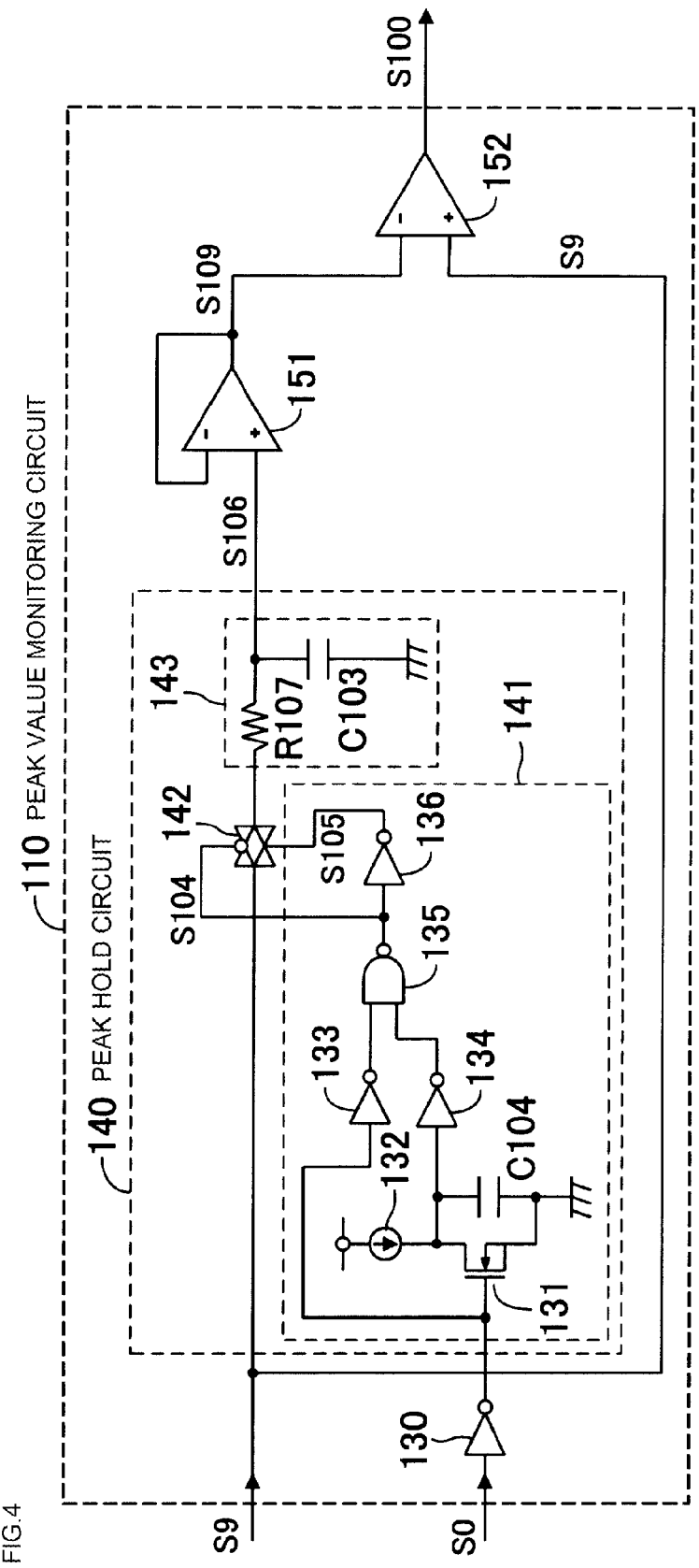
FIG. 4 is a circuit diagram showing a configuration example of a peak value monitoring circuit.
Figure 5:
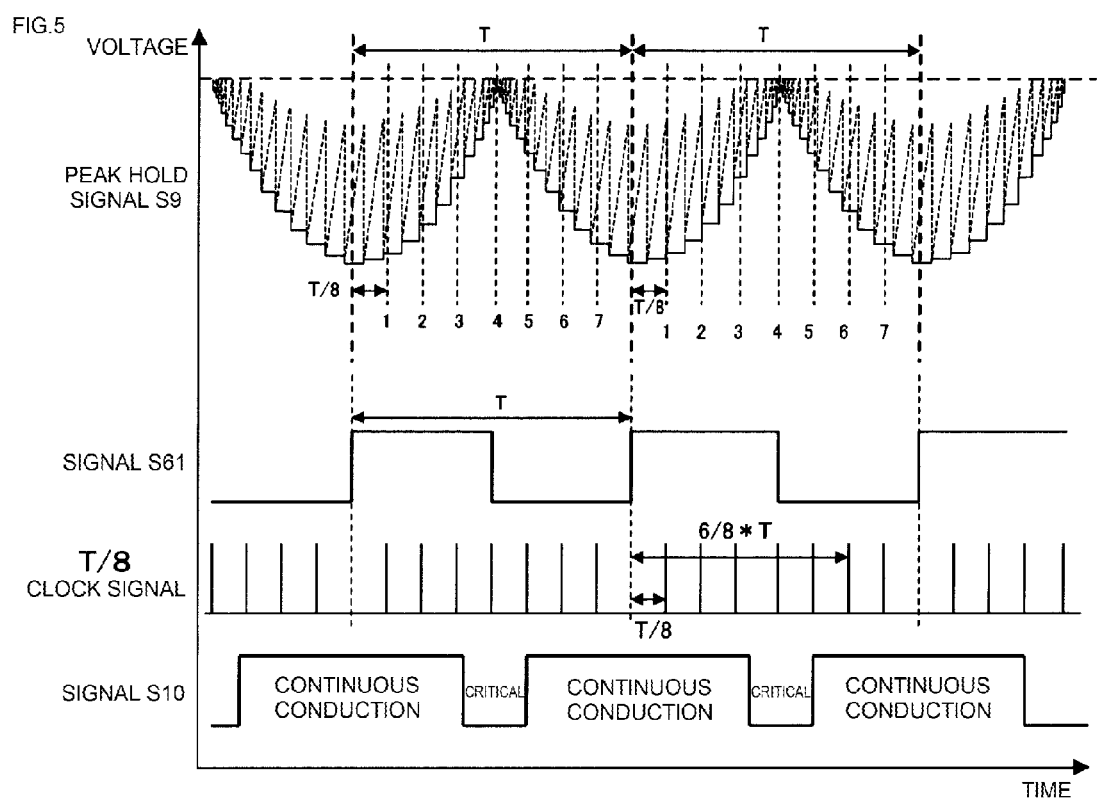
FIG. 5 is a diagram showing operation waveforms of the phase angle detector circuit.
Figure 6:
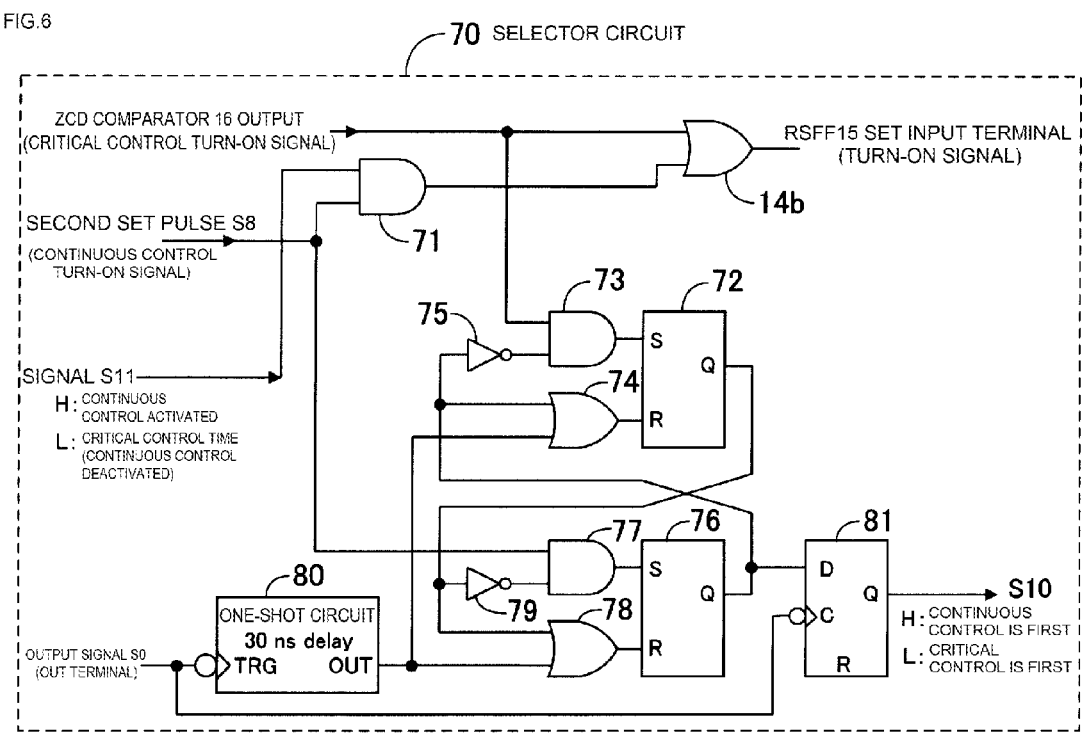
FIG. 6 is a circuit diagram showing a configuration example of a selector circuit.

FIG. 3 is a circuit diagram showing a configuration example of the phase angle detector circuit, FIG. 4 is a circuit diagram showing a configuration example of a peak value monitoring circuit, FIG. 5 is a diagram showing operation waveforms of the phase angle detector circuit, and FIG. 6 is a circuit diagram showing a configuration example of the selector circuit. FIGS. 7A through 7E are diagrams comparing current peak and a reference voltage signal wherein a peak hold signal has been divided in the existing example and the embodiment, wherein FIG. 7A shows a time of maximum current during critical control in the existing example, FIG. 7B shows a time of maximum current during critical control in the embodiment, FIG. 7C shows a time of medium load in the existing example, FIG. 7D shows a time of medium load in the embodiment, and FIG. 7E shows a time of a heavy load in the existing example and the embodiment.

As shown in FIG. 3, the output signal S0 (OUT terminal signal) of the RS flip-flop 15 and the peak hold signal S9 from the continuous conduction control setting circuit 30 are input into the phase angle detector circuit 60, and the phase angle detector circuit 60 includes a peak value monitoring circuit 110 that outputs a signal S100. The configuration is such that the output of the peak value monitoring circuit 110 is connected to the data input terminal of a D flip-flop 61, and the one-shot pulse S5 is input into the clock input terminal of the D flip-flop 61. The output terminal of the D flip-flop 61 is connected to the data input terminal of a D flip-flop 62, and the clock input terminal of the D flip-flop 62 is connected to the output terminal of an oscillator 63.

The output terminal of the D flip-flop 62 is connected via inverters 202 and 203 to the input terminal of a one-shot circuit 64, and connected to the clock input terminal of a latch circuit 66. Also, the output terminal of the oscillator 63 is connected to the clock input terminal of each of a counter 65 and a down counter 67. The output terminal of the one-shot circuit 64 is connected to the reset terminal of the counter 65, one input terminal of an OR circuit 209, and the reset terminal of a counter 204.

The counter 65 has an 11 bit configuration, and the output of the upper 8 bits corresponding to one-eighth of the count number of the 11 bits is connected to the input of the 8-bit configuration latch circuit 66. The output of the latch circuit 66 is connected to the input of the 8-bit configuration down counter 67. A Zero terminal of the down counter 67 is connected to the other input terminal of the OR circuit 209, and the output terminal of the OR circuit 209 is connected to a Load terminal of the down counter 67. Eight output terminals (Q0 to Q7) of the down counter 67 are connected to the input terminals of NOR circuits 68 and 69, and the output terminals of the NOR circuits 68 and 69 are connected to the input terminal of an AND circuit 200. The output terminal of the AND circuit 200 is connected to the data input terminal of a D flip-flop 201, and the output terminal of the oscillator 63 is connected to the clock input terminal of the D flip-flop 201.

The output terminal of the D flip-flop 201 is connected to the clock input terminal of the counter 204, and the 3-bit output terminals of the counter 204 are connected to the input terminals of AND circuits 210 and 211 of a decoder 205. The input terminals of the AND circuit 210 that receive outputs Q2 and Q0 of the counter 204 are inverting input terminals, wherein the AND circuit 210 detects that the outputs Q2, Q1, and Q0 of the counter 204 are "0, 1, 0", that is, "2". The input terminal of the AND circuit 210 that receives the output Q0 of the counter 204 is an inverting input terminal, wherein the AND circuit 211 detects that the outputs Q2, Q1, and Q0 of the counter 204 are "1, 1, 0", that is, "6". The output terminal of the AND circuit 210 is connected to the set terminal of an RS flip-flop 208. The output terminal of the AND circuit 211 is connected via a one-shot circuit 212 to one input terminal of an AND circuit 213, and the signal S10 from the selector circuit 70 is input into the other inverting input terminal of the AND circuit 213. The output terminal of the AND circuit 213 is connected to the reset terminal of the RS flip-flop 208, while the output terminal of the RS flip-flop 208 outputs the signal S11 that determines whether or not continuous conduction control is to be carried out, and supplies the signal S11 to the selector circuit 70.

As shown in FIG. 4, the peak value monitoring circuit 110 of the phase angle detector circuit 60 includes an inverter 130, a peak hold circuit 140, an amplifier circuit (voltage follower) 151, and a comparator circuit 152.

The peak hold circuit 140 includes a one-shot circuit 141, a transfer gate 142, and a hold circuit 143. The one-shot circuit 141 has a MOSFET 131, wherein the output signal S0 of the RS flip-flop 15 is inverted by the inverter 130 and supplied to the gate terminal of the MOSFET 131. The drain terminal of the MOSFET 131 is connected to a constant current supply 132, while the source terminal of the MOSFET 131 is connected to the ground. A connection point of the drain terminal of the MOSFET 131 and the constant current supply 132 is connected to one terminal of a capacitor C104 and the input terminal of an inverter 134. The other terminal of the capacitor C104 is connected to the ground. Also, the gate terminal of the MOSFET 131 is connected to the input terminal of an inverter 133. The output terminals of the inverters 133 and 134 are connected to input terminals of a NAND circuit 135, and the output terminal of the NAND circuit 135 is connected to the input terminal of an inverter 136. Also, the output terminal of the NAND circuit 135 is connected to the inverting input terminal of the transfer gate 142, and the output terminal of the inverter 136 is connected to the non-inverting input terminal of the transfer gate 142. Herein, the transfer gate 142 is in an on-state when an output signal S104 of the NAND circuit 135 is at an L level and an output signal S105 of the inverter 136 is at an H level, and supplies the peak hold signal S9 from the continuous conduction control setting circuit 30 to the hold circuit 143.

The hold circuit 143 has a resistor R107, to one terminal of which the output terminal of the transfer gate 142 is connected, while the other terminal of the resistor R107 is connected via a capacitor C103 to the ground. A connection point of the resistor R107 and capacitor C103 is connected to a non-inverting terminal of the amplifier circuit 151, and a peak level signal S106 held in the capacitor C103 is supplied to the amplifier circuit 151.

The output terminal of the amplifier circuit 151 is connected to an inverting input terminal of the amplifier circuit 151 itself, and is connected to an inverting input terminal of the comparator circuit 152, supplying a peak level signal S109 to the inverting input terminal. The peak hold signal S9 from the continuous conduction control setting circuit 30 is supplied to a non-inverting input terminal of the comparator circuit 152. The comparator circuit 152 compares the peak hold signal S9 and peak level signal S106, and supplies a signal S100 representing change in the peak hold signal S9 to the D flip-flop 61.

Herein, a description will be given of the peak value monitoring circuit 110 of the heretofore described configuration. The peak value monitoring circuit 110 into which the current peak hold signal S9 is input has the peak hold circuit 140, which is the same as the peak hold circuit 40 incorporated in the continuous conduction control setting circuit 30, but operates in a phase the reverse that of the peak hold circuit 40 of the continuous conduction control setting circuit 30. That is, the one-shot circuit 141 synchronous with the rise of the output signal S0 (OUT terminal signal) of the RS flip-flop 15 energizes the transfer gate 142, thereby charging the capacitor C103 of the hold circuit 143 with the signal value of the peak hold signal S9, and holding the value. The impedance of the signal value held in the hold circuit 143 is converted in the amplifier circuit 151, and the signal value is output as the peak level signal S109. The value of the peak level signal S109 is a value wherein the voltage value of the peak hold signal S9 has been copied. The comparator circuit 152 compares the peak hold signal S9 and the value of the peak level signal S109 of the amplifier circuit 151, and outputs the result.

The value of the peak hold signal S9 is updated at the fall of the following output signal S0 of the RS flip-flop 15. The comparator circuit 152 compares the current peak value of the previous cycle and the updated following current peak value at the update timing. Herein, when the value of the peak hold signal S9 is lower than that of the previous cycle (as the current value is input at a negative voltage, the actual current peak value increases), the comparator circuit 152 outputs the signal S100 at an L level. Conversely, when the value of the peak hold signal S9 is higher than that of the previous cycle (the actual current peak value decreases), the comparator circuit 152 outputs the signal S100 at an H level.

Returning to FIG. 3, the D flip-flop 61 takes in the signal S100 at the timing at which the one-shot pulse S5, which starts sampling in synchronization with a turning off state (L level) of the output signal S0 of the RS flip-flop 15, completes sampling. An output signal S61 of the D flip-flop 61 is output at an L level while the peak hold signal S9 is decreasing (the actual current peak value increases), and output at an H level while the peak hold signal S9 is increasing (the actual current peak value decreases).

As the actual current peak value changes in proportion to the alternating current input voltage, the output signal S61 of the D flip-flop 61 is at an L level while the input voltage is rising, reaching a maximum at a 90 degree phase angle, and the output signal S61 changes to an H level on the input voltage starting to decrease. Therefore, it can be determined that the timing at which the output signal S61 changes from the L level to the H level is the peak voltage portion (90 degree phase angle) of the alternating current input voltage.

The oscillator 63 causes a clock signal of a 10 microsecond (μs) cycle to be generated, but a detailed configuration of the interior will be omitted here. By the D flip-flop 62 sampling the output signal S61 of the D flip-flop 61 at the clock signal, and the counter 65 counting the number of times the clock signal is generated, the interval between timings at which the output signal S61 switches from the L level to the H level is counted. The interval forms one cycle T indicating a period from the maximum alternating current input voltage to the maximum alternating current input voltage.

As the commercial alternating current input voltage is 50 Hertz (Hz) or 60 Hz, and this is rectified by the full-wave rectifier circuit 1, the cycle T is 10 milliseconds (ms) or 8.33 ms. As this period is counted with the 10 μs clock signal, the counter 65 is configured of 11 bits, which can count to a maximum of 20.48 ms with ease.

When the D flip-flop 62 outputs a signal indicating the timing at which the output signal S61 switches from the L level to the H level, the latch circuit 66 stores the upper side 8 bits of the counter 65. Subsequently, the one-shot circuit 64 generates a reset pulse from a signal slightly delayed via the inverters 202 and 203 from the timing of a rising edge when the output of the D flip-flop 62 switches to the H level. When the counter 65 is reset by the reset pulse, the counter 65 subsequently repeats the counting of the next cycle T.

As the 8-bit data stored by the latch circuit 66 are data wherein the cycle T count number is shifted by 3 bits, they form a count number equivalent to one-eighth of the cycle T (herein, the remainder when dividing by 8 is rounded down).

As the reset pulse generated by the one-shot circuit 64 is also input via the OR circuit 209 into the Load terminal of the down counter 67, the data latched in the latch circuit 66 are also loaded into the down counter 67, and set as an initial value.

The down counter 67 counts down every time the clock signal is input. When the count value of the down counter 67 reaches "1", the circuit formed of the NOR circuits 68 and 69 and AND circuit outputs an H level signal to the data input terminal of the D flip-flop 201, outputs a load signal at the next clock signal at which the count value becomes zero, and is initialized by the latch data of the latch circuit 66.

As the output of the D flip-flop 201 changes (switches to the H level for 10 μs) every time the down counter 67 counts one-eighth of the cycle T, a second clock signal of ⅛*T cycle (corresponding to a phase angle size of 180/8=22.5 degrees) is input from the D flip-flop 201 into the counter 204. The decoder 205 is connected to the output of the counter 204.

The decoder 205 is connected to the outputs Q2, Q1, and Q0 of the counter 204 by the AND circuits 210 and 211, and detects a switch of the outputs Q2, Q1, and Q0 to "0, 1, 0", representing "2", or "1, 1, 0", representing "6". "2" of the counter 204 represents a timing of /2;8*T (135 degrees, wherein the phase angle has passed from the 90 degree peak through 22.4 degrees×2=45 degrees). Also, "6" represents a timing of /6;8*T (225 degrees, wherein the phase angle has passed from the 90 degree peak through 22.4 degrees× 6=135 degrees=45 degrees of the next cycle).

When the phase angle of the alternating input voltage is 135 degrees, the AND circuit 210 detects "2" of the counter 204, and supplies an H level signal to the set terminal of the RS flip-flop 208, thereby setting the RS flip-flop 208. Therefore, the RS flip-flop 208 outputs the signal S11 at an H level. The H level of the signal S11 indicates that the power factor correction circuit 10 is to carry out continuous conduction control, and means that even when continuous conduction control operation is deactivated in the previous high phase angle region, continuous conduction control operation is to be activated henceforth.

When the phase angle of the alternating input voltage is 45 degrees, the AND circuit 211 detects "6" of the counter 204, and outputs an H level signal to the one-shot circuit 212. Therefore, the one-shot circuit 212 outputs a one-shot pulse, and supplies the one-shot pulse to the input terminal of the AND circuit 213. The signal S10 is received from the selector circuit 70 in an inverting input terminal of the AND circuit 213. The signal S10 is a generation order determination signal that indicates which of a critical conduction control turn-on signal and a continuous conduction control turn-on signal is to be generated first. The signal S10 indicates that the continuous conduction control turn-on signal is to be generated first in the case of an H level, while the critical conduction control turn-on signal is to be generated first in the case of an L level.

Herein, when the signal S10 is at an L level, it is determined that the load is light, and the RS flip-flop 208 is reset by the output terminal of the AND circuit 213 switching to an H level at the timing at which the output of the counter 204 becomes "6". Therefore, the output signal S11 of the RS flip-flop 208 switches to an L level, and the power factor correction circuit 10 is such that the continuous conduction control operation switches to being deactivated, and the critical conduction control operation is carried out in a high phase angle region. Also, when the signal S10 is at an H level at the timing at which the output of the counter 204 becomes "6", it is determined that the load is heavy, and the output terminal of the AND circuit 213 switches to an L level. Therefore, the output signal S11 of the RS flip-flop 208 remains at the H level, and the continuous conduction control operation is activated at a high phase angle too.

Next, referring to the operation waveforms shown in FIG. 5, a description will be given of an operation of the phase angle detector circuit 60.

As the IS terminal detects negative voltage, the peak hold signal S9 that holds the current peak value has a low voltage value when the alternating current input voltage is high, and has a high voltage value when the alternating current input voltage is low. The transition of the stepped form of the peak hold signal S9 and a dotted line representing the inductor current are shown in the drawing, but the switching cycle is shown considerably extended for ease of understanding. Actually, the switching cycle is shorter, and the voltage change of the peak hold signal S9 is a fine change.

The output terminal signal S61 of the D flip-flop 61 is at an L level for a period in which the peak hold signal S9 is falling, and at an H level for a period in which the peak hold signal S9 is rising. The timing of the peak of the alternating current input voltage can be found by detecting the timing at which the signal S61 switches from the L level to the H level.

In the phase angle detector circuit 60, firstly, the one-shot circuit 64 resets the counters 65 and 204 in synchronization with a rising edge when the signal S61 switches from the L level to the H level, and subsequent periods are counted in the counter 65 using the 10 μs cycle first clock signal generated by the oscillator 63. The T/8 cycle second clock signal corresponding to one-eighth of the count value is generated by the latch circuit 66, down counter 67, and D flip-flop 201. The phase angle of the input voltage waveform can be detected every 22.5 degrees by the T/8 cycle second clock signal.

The signal S10 is a signal that monitors which of a continuous conduction control turn-on signal (the second set pulse S8) and a critical conduction control turn-on signal is to be generated first, and is at an H level when the continuous conduction control turn-on signal is to be generated first, and at an L level when the critical conduction control turn-on signal is to be generated first.

Next, referring to FIG. 6, a description will be given of the configuration of the selector circuit 70.

The selector circuit 70 has the OR circuit 14*b*, one input terminal of which receives a critical conduction control turn-on signal (the first set pulse), which is the output of the ZCD comparator 16, while the output terminal of an AND circuit 71 is connected to the other input terminal. The AND circuit 71 receives the second set pulse S8 and the signal S11 from the phase angle detector circuit 60 in input terminals thereof. The output terminal of the OR circuit 14*b* is connected to the set terminal of the RS flip-flop (RSFF) 15.

The selector circuit 70 also has RS flip-flops 72 and 76, AND circuits 73 and 77, OR circuits 74 and 78, and inverters 75 and 79. The critical conduction control turn-on signal (first set pulse) is input via the AND circuit 73 into the set terminal of the RS flip-flop 72. The second set pulse S8, which is the continuous conduction control turn-on signal, is input via the AND circuit 77 into the set terminal of the RS flip-flop 76. The output terminal of the RS flip-flop 76 is connected via the inverter 75 to the input terminal of the AND circuit 73, and is connected to one input terminal of the OR circuit 74, while the output terminal of the OR circuit 74 is connected to the reset terminal of the RS flip-flop 72. The output terminal of the RS flip-flop 72 is connected via the inverter 79 to the input terminal of the AND circuit 77, and is connected to one input terminal of the OR circuit 78, while the output terminal of the OR circuit 78 is connected to the reset terminal of the RS flip-flop 76.

The selector circuit 70 further has a one-shot circuit 80 and a D flip-flop 81. The output signal S0 of the RS flip-flop 15 is input into an inverting trigger input terminal of the one-shot circuit 80 and an inverting clock input terminal of the D flip-flop 81. The output terminal of the one-shot circuit 80 is connected to the other input terminals of the OR circuits 74 and 78. The data input terminal of the D flip-flop 81 is connected to the output terminal of the RS flip-flop 76, while the output terminal of the D flip-flop 81 outputs the signal S10, which is supplied to the phase angle detector circuit 60.

According to the selector circuit 70, the critical conduction control turn-on signal (first set pulse) and, via the AND circuit 71, the continuous conduction control turn-on signal (selector circuit 70) are input into the two inputs of the OR circuit 14*b*. Of the two input signals, the signal that first reaches an H level is input via the OR circuit 14*b* into the set terminal of the RS flip-flop 15, at which timing the OUT terminal switches to an H level, and the switching element 4 is turned on.

In addition to the continuous conduction control turn-on signal, the signal S11 from the phase angle detector circuit 60, which determines whether or not continuous control is to be activated, is input into the AND circuit 71. When the signal S11 is input at an H level, operation can be carried out under continuous control, and the switching element 4 is turned on at the timing of the signal first input into the OR circuit 14*b*, as previously described. When the signal S11 is at an L level, the output of the AND circuit 71 is fixed at the L level, the continuous control second set pulse S8 is invalid even when generated first, and the switching element 4 is always turned on under critical control.

The RS flip-flops 72 and 76, AND circuits 73 and 77, OR circuits 74 and 78, and inverters 75 and 79 configure a circuit that determines which of the critical conduction control turn-on signal and continuous conduction control turn-on signal (second set pulse S8) is generated first. The critical conduction control turn-on signal is input into the AND circuit 73 while the continuous conduction control turn-on signal is input into the AND circuit 77, and for a period in which neither inputs has yet reached the H level, the output signals of both RS flip-flops 72 and 76 are at the L level. Further, the RS flip-flop 72 or 76 on the side on which the turn-on signal first reaches the H level is set, and outputs an H level output signal. In this case, the output signal fixes the set terminal of the RS flip-flop on the opposite side at the L level, thereby deactivating the set terminal, fixes the reset terminal at the H level, and fixes the output terminal at the L level. Consequently, the determination circuit is such that only the output terminal of the RS flip-flop on the side on which the turn-on signal is generated first is at the H level, while the output terminal of the RS flip-flop on the opposite side is at the L level.

Also, the output signal of the RS flip-flop 76 is read and updated by the D flip-flop 81 at the falling edge of the output signal S0 of the RS flip-flop 15 in every switching cycle. Further, the output signal of the D flip-flop 81 is sent to the phase angle detector circuit 60 as the signal S10.

Furthermore, the output signal S0 of the RS flip-flop 15 is input into the one-shot circuit 80, and the one-shot circuit 80 generates a reset pulse slightly (for example, 30 nanoseconds (ns)) delayed from the read timing of the D flip-flop 81. The generated reset pulse is input through the OR circuits 74 and 78 to the reset terminals of the RS flip-flops 72 and 76, thereby resetting the RS flip-flops 72 and 76, and switching the output terminal of each of the RS flip-flops 72 and 76 to the L level.

By this operation being carried out in every switching cycle, the output signal S10 of the D flip-flop 81 is at the L level for a period in which the critical conduction control turn-on signal is being generated first, and at the H level for a period in which the continuous conduction control turn-on signal is being generated first.

The signal S10 is input into the inverting input terminal of the AND circuit 213 of the phase angle detector circuit 60 of FIG. 3. Meanwhile, an output signal from the one-shot circuit 212, indicating the timing at which the phase angle detected by the AND circuit 211 is 225 degrees=45 degrees of the next cycle, is input into the non-inverting input terminal of the AND circuit 213. Therefore, when the continuous conduction control turn-on signal is generated first at the 45 degree phase angle timing, the output of the AND circuit 213 does not switch to the H level, and the RS flip-flop 208 is not reset. As a result of this, the RS flip-flop 208 remains set at the 135 degree phase angle of the previous cycle, the signal S11 is maintained at the H level, and the continuous control signal is activated. Meanwhile, when the critical conduction control turn-on signal is generated first at the 45 degree phase angle timing, the RS flip-flop 208 is reset, the signal S11 is switched to the L level, thereby deactivating the continuous control signal, and switching is carried out so that critical operation is carried out until the 135 degree phase angle.

Next, examples of a current peak value (inverted) transition waveform according to load, and a change in the current value at which the continuous control turn-on signal is emitted at the reference voltage signal S7, in a case of a critical-continuous switching method of the existing example, and a case of the switching method of the embodiment are shown in FIGS. 7A through 7E. The numerals on the vertical axis with respect to the signal S7 are numerals indicating the difference with respect to Vzero.

Herein, when there is a light load, critical control is carried out in each case, and the operation of the switching power supply circuit is the same, because of which no comparison will be made at this point between the existing example and embodiment.

As the load becomes heavier, the existing example is such that the reference voltage signal S7 drops but is still above 0V, as shown by the fine line in FIG. 7A, because of which critical control is carried out in all regions. As shown by the heavy line in the diagram, turned on current is turned off at the point of flowing to the negative voltage detection current peak line, and turned on again when the current decreases to 0 A. Meanwhile, as shown in FIG. 7B, the embodiment is such that even when the reference voltage signal S7 decreases, continuous control is masked in a high phase angle portion of phase angles from 45 degrees to 135 degrees provided that the region in which the reference voltage signal S7 is negative (with respect to Vzero) is in the range of phase angles from 45 degrees to 135 degrees. Therefore, even when continuous control is generated before critical control in the high phase angle portion, critical control continues in the portion of phase angles from 45 degrees to 135 degrees. Therefore, the current peak curvature can be gentler than in the existing example. In order for the curvature of the reference voltage signal S7 to be gentler, it is sufficient that the reference voltage Vref2 of the level conversion circuit 20 is set low, and that the resistance ratio (R21+R22)/(R21+R22+R23+R24) is set small. However, when reducing the curvature of the reference voltage signal S7 in this way, the reference voltage signal S7 is liable to become negative (the region in which the reference voltage signal S7 is negative increases in size). FIGS. 7B, 7D, and 7E show examples of cases wherein the current peak curvature is reduced and the power factor improved by reducing the curvature of the reference voltage signal S7 in this way.

When the load increases further, becoming the intermediate load shown in FIGS. 7C and 7D, continuous control is carried out in a portion in which the line of the reference voltage signal S7 is 0V or under in the existing example. Also, in the embodiment too, when the continuous control signal is generated before the critical control at the 45 degree phase angle timing, continuous control is activated at this point, and continuous control can also be carried out in the period of phase angles from 45 degrees to 135 degrees, during which masking can be carried out.

When the load becomes heavier still, the level of the reference voltage signal S7 drops further, and continuous control gradually starts to be carried out in a low phase angle portion too. In the case of a heavy load forming a continuous mode in a period from a 135 degree phase angle to a 45 degree phase angle of the next cycle, the waveforms are as shown in FIG. 7E in both the existing example and the embodiment.

As heretofore described, according to the switching power supply circuit and power factor correction circuit of the disclosure, a switch to continuous conduction control can be masked in a high phase angle (45 degrees to 135 degrees in the embodiment) portion of the alternating current input voltage waveform. Further, at a point immediately before (a 45 degree phase angle) the start of the period in which masking can be carried out, it is determined which of the critical conduction control and continuous conduction control turn-on signals is generated first. By switching continuous conduction control to active based on the determination, the peak current curvature can be reduced, and the range of operating under continuous conduction control when switching to continuous conduction control can be increased. Therefore, current peak distortion, which increases on the high phase angle side, is reduced, and the power factor can be improved. Also, by the continuous operation range increasing, the maximum value of peak current when supplying the same load power can also be reduced.

Although phase angles of 45 degrees and 135 degrees are detected in the embodiment, this is not limiting. For example, changing so as to detect other phase angles by changing the configuration of the phase angle detector circuit 60, such as by the latch circuit 66 latching the upper n bits (n<8) of the counter 65, thereby dividing the phase angle more finely, also comes within the scope of the disclosure.

Additionally, although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A switching power supply circuit configured to generate a direct current output voltage of a predetermined value and to supply the direct current output voltage to a load, comprising:
    a rectifier circuit configured to full-wave rectify an alternating current power supply to obtain a pulsating output;
    an inductor connected to the rectifier circuit and configured to receive the pulsating output;
    a switching element;
    an output capacitor;
    a phase angle detector circuit configured to detect a phase angle of the alternating current power supply;
    an inductor current detector circuit configured to detect a current of the pulsating output flowing into the inductor and to output an inductor current detection voltage;
    a level conversion circuit configured to convert the inductor current detection voltage into first and second current level signals of mutually differing voltage levels;
    a continuous control setting circuit configured to generate a set pulse regulating a turn-on timing of the switching element by generating a reference voltage signal, which changes practically in phase with an alternating current input voltage waveform full-wave rectified, from the first current level signal and by comparing the reference voltage signal with the voltage level of the second current level signal;
    a zero current detector circuit configured to detect whether the current of the pulsating output flowing into the inductor has reached zero; and
    a turn-on timing selector circuit configured to
        determine which is earlier between generation of the set pulse by the continuous control setting circuit and generation of a signal indicating detection by the zero current detector circuit that current flowing into the inductor has reached zero, to thereby obtain a determination result, and
        select one of the turn-on timing of the switching element regulated by the continuous control setting circuit and a timing at which the zero current detector circuit detects that current flowing into the inductor has reached zero based on the determination result, wherein
    the phase angle detector circuit is configured to set, at a point of a specified phase angle of the alternating current power supply, enabling or disabling of the turn-on timing based on the determination result of the turn-on timing selector circuit, and
    the turn-on timing selector circuit is configured to switch the switching element to an on-state with the set pulse regulating the turn-on timing generated by the continuous control setting circuit only when the phase angle detector circuit sets the enabling of the turn-on timing regulated by the continuous control setting circuit.

2. The switching power supply circuit according to claim 1, wherein the phase angle detector circuit is configured to hold a voltage value corresponding to a peak current value of the inductor current detection voltage in every switching cycle, and
    detect the phase angle from a change in the held voltage value.

3. The switching power supply circuit according to claim 1, wherein the continuous control setting circuit comprises:
    a peak hold circuit configured to hold the voltage level of the first current level signal at every turn-off timing of the switching element and to generate a peak level signal from the first current level signal; and
    a set pulse generator circuit configured to generate the reference voltage signal by converting a voltage level of the peak level signal, and to generate the set pulse regulating the turn-on timing of the switching element by comparing the reference voltage signal and the voltage level of the second current level signal.

4. The switching power supply circuit according to claim 1, wherein the turn-on timing selector circuit comprises:
    an OR circuit that switches the switching element to an on-state by a turn-on signal of the turn-on timings detected by the zero current detector circuit and a logical product signal, wherein the set pulse generated by the continuous control setting circuit and a determination signal indicating the result of the determination by the turn-on timing selector circuit are inputs to the logical product signal;
    a first flip-flop configured to hold the turn-on signal;
    a second flip-flop configured to hold the set pulse; and
    a third flip-flop configured to output a signal indicating to the phase angle detector circuit which of the turn-on signal and the set pulse has been generated first by holding an output of the second flip-flop at the turn-off timing of the switching element,
    wherein the second flip-flop is reset when the first flip-flop is holding the turn-on signal, and the first flip-flop is reset when the second flip-flop is holding the set pulse.

5. The switching power supply circuit according to claim 4, comprising a one-shot circuit configured to generate a reset pulse resetting the first flip-flop and the second flip-flop after the third flip-flop holds the output of the second flip-flop.

6. The switching power supply circuit according to claim 1, wherein, when the phase angle detector circuit sets the disabling of the turn-on timing regulated by the continuous control setting circuit, the switching element switches in accordance with the timing at which the zero current detector circuit detects that current flowing into the inductor has reached zero.

7. A power factor correction circuit for a switching power supply circuit having a rectifier circuit that full-wave rectifies an alternating current power supply to obtain a pulsating output, an inductor connected to the rectifier circuit and configured to receive the pulsating ouput, a switching element, an output capacitor, and an inductor current detector circuit that detects current flowing into the inductor and outputs inductor current detection voltage, the switching power supply circuit generating direct current output voltage of a predetermined value from the alternating current power supply and supplying the direct current output voltage to a load, the power factor correction circuit comprising:
- a phase angle detector circuit configured to detect a phase angle of the alternating current power supply;
- a level conversion circuit configured to convert the inductor current detection voltage into first and second current level signals of mutually differing voltage levels;
- a continuous control setting circuit configured to generate a set pulse regulating a turn-on timing of the switching element by generating a reference voltage signal, which changes practically in phase with an alternating current input voltage waveform full-wave rectified, from the first current level signal and by comparing the reference voltage signal with the voltage level of the second current level signal;
- a zero current detector circuit configured to detect whether the current of the pulsating output flowing into the inductor has reached zero; and
- a turn-on timing selector circuit configured to
  - determine which is earlier between generation of the set pulse by the continuous control setting circuit and generation of a signal indicating detection by the zero current detector circuit that current flowing into the inductor has reached zero, to thereby obtain a determination result, and
  - select one of the turn-on timing of the switching element regulated by the continuous control setting circuit and a timing at which the zero current detector circuit detects that current flowing into the inductor has reached zero based on the determination result, wherein
- the phase angle detector circuit is configured to set, at a point of a specified phase angle of the alternating current power supply, enabling or disabling of the turn-on timing based on the determination result of the turn-on timing selector circuit, and
- the turn-on timing selector circuit is configured to switch the switching element to an on-state with the set pulse regulating the turn-on timing generated by the continuous control setting circuit only when the phase angle detector circuit sets the enabling of the turn-on timing regulated by the continuous control setting circuit.

8. The power factor correction circuit according to claim 7, wherein the phase angle detector circuit is configured to hold a voltage value corresponding to a peak current value of the inductor current detection voltage in every switching cycle, and
detect the phase angle from a change in the held voltage value.

9. The power factor correction circuit according to claim 7, wherein the continuous control setting circuit comprises:
- a peak hold circuit configured to hold the voltage level of the first current level signal at every turn-off timing of the switching element and to generate a peak level signal from the first current level signal; and
- a set pulse generator circuit configured to generate the reference voltage signal by converting a voltage level of the peak level signal, and to generate the set pulse regulating the turn-on timing of the switching element by comparing the reference voltage signal and the voltage level of the second current level signal.

10. The power factor correction circuit according to claim 7, wherein the turn-on timing selector circuit comprises:
- an OR circuit that switches the switching element to an on-state by a turn-on signal of the turn-on timings detected by the zero current detector circuit and a logical product signal, wherein the set pulse generated by the continuous control setting circuit and a determination signal indicating the result of the determination by the turn-on timing selector circuit are inputs to the logical product signal;
- a first flip-flop configured to hold the turn-on signal;
- a second flip-flop configured to hold the set pulse; and
- a third flip-flop configured to output a signal indicating to the phase angle detector circuit which of the turn-on signal and the set pulse has been generated first by holding an output of the second flip-flop at the turn-off timing of the switching element,
wherein the second flip-flop is reset when the first flip-flop is holding the turn-on signal, and the first flip-flop is reset when the second flip-flop is holding the set pulse.

11. The power factor correction circuit according to claim 10, comprising a one-shot circuit configured to generate a reset pulse resetting the first flip-flop and the second flip-flop after the third flip-flop holds the output of the second flip-flop.

12. The switching power supply circuit according to claim 10, wherein, when the phase angle detector circuit sets the disabling of the turn-on timing regulated by the continuous control setting circuit, the switching power supply circuit switches the switching element in accordance with the timing at which the zero current detector circuit detects that current flowing into the inductor has reached zero.

\* \* \* \* \*

UNITED STATES PATENT AND TRADEMARK OFFICE
CERTIFICATE OF CORRECTION

| | | |
|---|---|---|
| PATENT NO. | : 9,660,519 B2 | Page 1 of 1 |
| APPLICATION NO. | : 14/988247 | |
| DATED | : May 23, 2017 | |
| INVENTOR(S) | : Hiroshi Maruyama | |

It is certified that error appears in the above-identified patent and that said Letters Patent is hereby corrected as shown below:

In the Claims

Column 22, Line 65, In Claim 7, delete "ouput," and insert -- output, --, therefore.

Column 24, Line 43, In Claim 12, delete "switching power supply" and insert -- power factor correction --, therefore.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*